(12) United States Patent
Gray

(10) Patent No.: US 7,747,981 B2
(45) Date of Patent: Jun. 29, 2010

(54) METHOD OF DYNAMICALLY LINKING OBJECTS OPERATED ON BY A COMPUTATIONAL SYSTEM

(75) Inventor: Theodore W. Gray, Urbana, IL (US)

(73) Assignee: Wolfram Research, Inc., Champaign, IL (US)

( * ) Notice: Subject to any disclaimer, the term of this patent is extended or adjusted under 35 U.S.C. 154(b) by 1222 days.

(21) Appl. No.: 11/234,550

(22) Filed: Sep. 23, 2005

(65) Prior Publication Data

US 2007/0073705 A1    Mar. 29, 2007

(51) Int. Cl.
*G06F 9/44* (2006.01)
(52) U.S. Cl. .................. 717/108; 717/107; 717/109; 717/111; 717/113; 717/121
(58) Field of Classification Search ............. None
See application file for complete search history.

(56) References Cited

U.S. PATENT DOCUMENTS 5,566,330 A * 10/1996 Sheffield ................ 707/4
6,119,186 A * 9/2000 Watts et al. .............. 710/104

* cited by examiner

*Primary Examiner*—Chuck O Kendall
(74) *Attorney, Agent, or Firm*—Marshall, Gerstein & Borun LLP

(57) ABSTRACT

In a method for presenting to a user information operated on by a computational software application, a relationship between states of a user interface mechanism located on a workspace associated with the computational software application and an underlying object operated on by the computational software application may be determined. The relationship may be defined at least in part by configuration data capable of being interpreted by the computational software application. A change in a value of the underlying object may be detected, and a current state of the user interface mechanism may be changed based on the detected change in the value of the underlying object and according to the relationship. Additionally, a change in the current state of the user interface mechanism caused by a user may be detected, and the current value of the underlying object may be changed based on the detected change in the current state of the user interface mechanism and according to the relationship.

26 Claims, 17 Drawing Sheets

In[1]:= Dynamic[x^2]

Out[1]= $\left( \dfrac{\text{ArcTan}\left[\frac{1+2y}{\sqrt{3}}\right]}{\sqrt{3}} - \dfrac{1}{3} \text{Log}[-1+y] + \dfrac{1}{6} \text{Log}[1+y+y^2] \right)^2$ In[2]:= x = 5
In[3]:= x = 7
In[4]:= x = Integrate$\left[\dfrac{1}{1-y^3}, y\right]$;

METHOD OF DYNAMICALLY LINKING OBJECTS OPERATED ON BY A COMPUTATIONAL SYSTEM

TECHNICAL FIELD

This disclosure generally relates to computational software applications, and more particularly to techniques for dynamically linking abstract symbolic objects operated on by computational software applications.

DESCRIPTION OF THE RELATED ART

This disclosure will refer to a particular implementation of these techniques in the MATHEMATICA® software system available from Wolfram Research, Inc. The methods themselves are more general and could be implemented in a variety of software environments. To understand the illustrations, however, requires some familiarity with the MATHEMATICA® environment.

MATHEMATICA® is a powerful computational tool that can evaluate general symbolic expressions, as well as mathematical and numeric expressions. A unifying feature of MATHEMATICA® is that everything is internally represented as a symbolic expression, with all more specific data types treated as special cases—symbols to which additional rules apply. MATHEMATICA® is an interpreted language, with a notion of "evaluation" of symbolic expressions. Evaluation consists in applying to any symbolic expression all transformation rules that fit that expression.

In the MATHEMATICA® software system, a user can create interactive electronic documents referred to as "notebooks." Various expressions, including numeric and symbolic expressions, can be entered into a notebook via a keyboard, for example, and a user can cause the expression to be evaluated. As a simple example, a user could set a variable x to the numeric value 5 by typing "x=5" into the notebook and then pressing "Enter" while holding down the "Shift" key. This is shorthand for the expression Set[x, 5], calling the built in function "Set".

In response, the MATHEMATICA® software system conceptually sets the abstract variable x to the value 5. The symbolic expression "x" can, when evaluated, be replaced by the symbol 5. This is one technique by which an interpreted symbolic language may implement variables and variable assignments.

Next, the user could type in an expression $x^2$ by typing "x^2" into the notebook. To evaluate this expression, the user could then press "Enter" while holding down the "Shift" key. In response, the MATHEMATICA® software system evaluates $x^2$ based on the current value of x (set by the user to 5) and would then display "25" in the notebook. To have the notebook display the value of $x^2$ for a different value of x, the user could first type into the notebook the new value of x. For example, the user could type "x=7" into the notebook and then pressing "Shift" and "Enter". In response, the MATHEMATICA® software system resets the variable x to the value 7. Next, the user could retype "x^2" into the notebook and then press "Shift" and "Enter". Alternatively, instead of retyping "x^2" into the notebook, the user could place a cursor on or next to the previously entered expression "x^2" and then press "Shift" and "Enter". In response, the MATHEMATICA® software system evaluates $x^2$ based on the new value of x (set by the user to 7) and would then display "49" in the notebook.

If no value has been assigned to a symbol, evaluation will return the symbol itself unchanged. Thus if a user types x^2, holds "shift" and "enter", without any previous "Set" operation, the MATHEMATICA® software system will return $x^2$. The system knows various rules to apply to compound symbolic expressions (through functions like "Expand" or "Simplify", for example), whether their component sub-expressions have "Set" values or not.

Spreadsheet software applications, such as the EXCEL® software application available from Microsoft Corporation, permit a user to create spreadsheets comprising grids of cells. In a spreadsheet, a value in one cell may be dependent upon a value in one or more other cells. For example, a user may assign a formula to a first cell that uses a value from a second cell. Then, the spreadsheet application will calculate an output of the formula using the value from the second cell, and will display the calculated value in the first cell. When a user changes the value of the first cell, the spreadsheet application will recalculate the value of the formula of the second cell. Such applications require inputs to the first cell in a numeric form, need an explicit formula taking numeric input to relate the contents of the second cell to the numeric values in the first, and output numeric output to the second cell.

DETAILED DESCRIPTION

Figure 1:
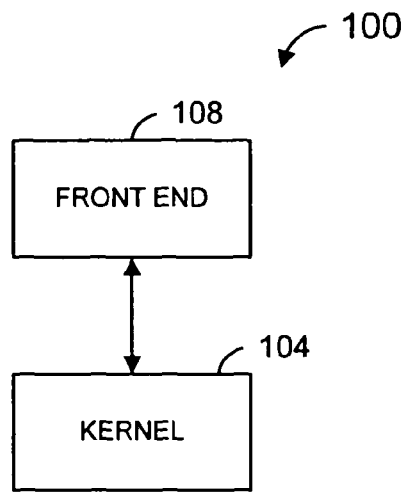
FIG. 1 is a high level block diagram of an example computational software system in which methods and techniques described herein may be implemented.

One of the disclosed embodiments is directed to a method for presenting to a user information operated on by a computational software application. The method may comprise determining a relationship between states of a user interface mechanism located on a workspace associated with the computational software application and an underlying object operated on by the computational software application. The relationship may be defined at least in part by configuration data capable of being interpreted by the computational software application. The method may also comprise detecting a change in a value of the underlying object, and changing a current state of the user interface mechanism based on the detected change in the value of the underlying object and according to the relationship. Additionally, the method may comprise detecting a change in the current state of the user interface mechanism caused by a user, and changing the current value of the underlying object based on the detected change in the current state of the user interface mechanism and according to the relationship.

Another of the disclosed embodiments is directed to a computer readable medium having stored thereon machine executable instructions. The machine executable instructions may be capable of causing the machine to determine a relationship between states of a user interface mechanism located on a workspace associated with the computational software application and an underlying object operated on by the computational software application, the relationship defined at least in part by configuration data capable of being interpreted by the computational software application. Additionally, the machine executable instructions may be capable of causing the machine to detect a change in a value of the underlying object, and change a current state of the user interface mechanism based on the detected change in the value of the underlying object and according to the relationship. Further, the machine executable instructions may be capable of causing the machine to detect a change in the current state of the user interface mechanism caused by a user, and change the current value of the underlying object based on the detected change in the current state of the user interface mechanism and according to the relationship.

Yet another of the disclosed embodiments is directed to a method for presenting to a user information operated on by a computational software application. The method may include identifying a dynamic object in a file operated on by the computational software application, a value of the dynamic object being dependent upon at least one underlying object. The method may also include determining if the value of the dynamic object is to be rendered, and determining if a value of the underlying object has changed. Additionally, the method may include recalculating the value of the dynamic object based on if the dynamic object is to be rendered and if the value of the underlying object has changed, and causing an indication of the value of the dynamic object to be rendered to the user.

Still another of the disclosed embodiments is directed to a computer readable medium having stored thereon machine executable instructions. The machine executable instructions may be capable of causing the machine to identify a dynamic object in a file operated on by the computational software application, a value of the dynamic object being dependent upon at least one underlying object. The machine executable instructions may also be capable of causing the machine to determine if the value of the dynamic object is to be rendered, and determine if a value of the underlying object has changed. Additionally, the machine executable instructions may be capable of causing the machine to recalculate the value of the dynamic object based on if the dynamic object is to be rendered and if the value of the underlying object has changed, and cause an indication of the value of the dynamic object to be rendered to the user.

Yet another disclosed embodiment is directed to a method for presenting information to a user. The method may comprise identifying a dynamic object, a value of the dynamic object being dependent upon at least one underlying object, the value of the dynamic object comprising at least one of a symbolic expression, a graphic expression, or an animation, and determining if a value of the underlying object changed. The method may also comprise recalculating the value of the dynamic object if the value of the underlying object has changed, and causing an indication of the value of the dynamic object to be rendered to the user.

Still another disclosed embodiment is directed to a computer readable medium having stored thereon machine executable instructions. The machine executable instructions may be capable of causing the machine to identify a dynamic object, a value of the dynamic object being dependent upon at least one underlying object, the value of the dynamic object comprising at least one of a symbolic expression, a graphic expression, or an animation, and determine if a value of the underlying object changed. Additionally, the machine executable instructions may be capable of causing the machine to recalculate the value of the dynamic object if the value of the underlying object has changed, and cause an indication of the value of the dynamic object to be rendered to the user.

Example Environment

FIG. 1 is a high level block diagram of an example system 100 in which methods and techniques to be described below may be implemented. In particular, the system 100 comprises a kernel 104 in data communication with a front end 108. In general, the kernel 104 may comprise software components that perform computations such as numeric computations, symbolic computations, graphic computations, etc. The front end 108 may comprise software components that handle interaction with a user. For example, the front end 108 may include software configured to permit the user to enter expressions to be evaluated by the kernel 104, to permit a user to initiate evaluations of expressions, to display results of evaluations to the user, etc.

The kernel 104 and the front end 108 may be implemented on a same computing system or on different computing systems that are communicatively coupled to one another. Thus, the kernel 104 and the front end 108 may communicate via a communication link that comprises one or more of procedure calls, messages, a proprietary application programming interface (API) (e.g., the API provided by MATHLINK® software available from Wolfram Research, Inc.), etc. Additionally, if the kernel 104 and the front end 108 are implemented on different computing systems, the kernel 104 and the front end 108 may communicate via one or more of a local area network (LAN), a wide area network (WAN), the Internet, a point-to-point communication link, a wired communication link, a wireless communication link, etc.

The front end may include an interactive document referred to as a notebook similar to those often used with MATHEMATICA® software systems. A notebook may include input to be sent to the kernel 104 and output received from the kernel, as well as text, graphics, palettes, etc. A notebook may include menus and graphical tools for creating and reading notebook documents and for sending information to and receiving information from the kernel 104.

Figure 2:
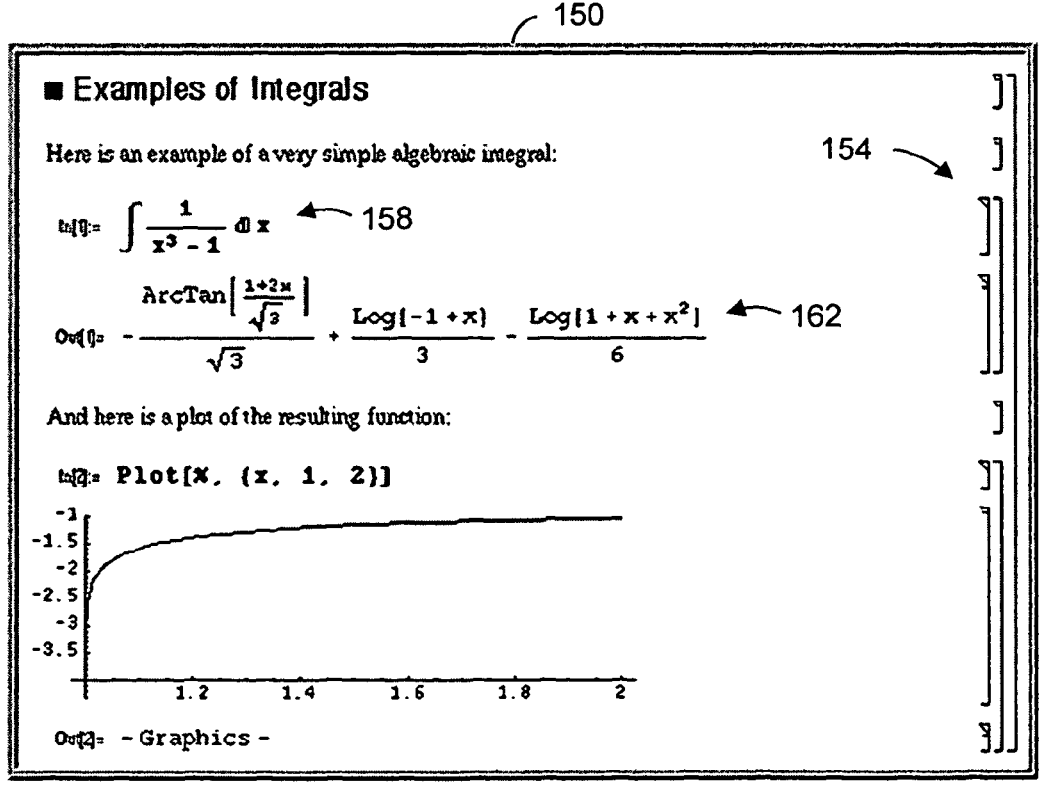
FIG. 2 is an illustration of an example interactive document that may used with a computational software system.

FIG. 2 is an illustration of an example notebook 150. A notebook may comprise a structured interactive document organized into a sequence of cells. Each cell may contain material of a definite type (e.g., text, graphics, sounds, an expression, etc.). When a notebook is displayed on a screen of a computing system, the extent of each cell may be indicated by a bracket on the right. Referring to FIG. 2, brackets 154 indicate cells of the notebook 150.

A user can cause information in a cell to be sent to the kernel 104 as input by pressing "Enter" or "Return" while holding down the "Shift" key after a cursor has been placed in the cell. The kernel 104 then evaluates the input to generate an output. The kernel 104 may then send the generated output back to the front end 108. In response, the front end 108 may create one or more new cells in the notebook to display this output. Referring to FIG. 2, a line 158 corresponds to an input sent to the kernel 104 and a line 162 corresponds to an output generated by the kernel 104 and sent back to the front end 108.

In notebooks used with MATHEMATICA® software systems, the front end 108 labels each line of input with "In[n]:=" and labels each line of output with "Out[n]=", where n indicates the nth input to the kernel 104 or the output generated by the kernel 104 in response to the nth input.

Alternatively, the front end 108 may comprise a text-based interface in which text typed on a keyboard of a computing system is sent directly to the kernel 104. With a text-based interface, a user may interact with the kernel 104 by typing successive lines of input, and getting back from the kernel 104 successive lines of output displayed on a display screen of the computing system. For example, a prompt of the form "In[n]:=" may be displayed on the display screen to indicate to a user that the kernel 104 is ready to receive input. After the input is typed in and sent to the kernel 104, the kernel 104 may process the input, generate an output, and send that output for display on the display screen with a label of the form "Out [n]=".

In some implementations, the front end 108 may be omitted. For example, a software program that does not interface with a user may communicate with the kernel 104 in a manner similar to communications between the kernel 104 and the front end 108 discussed above. This may comprise interaction via an API (e.g., the API provided by MATHLINK® software), via files, via an extensible markup language (XML), etc.

The kernel 104 may be capable of evaluating different kinds of computations such as numeric computations, symbolic computations (e.g., algebraic computations, integrations, derivatives, etc.), graphic computations, etc. Referring again to FIG. 2, the expression 158 is a symbolic expression. The kernel 104 evaluated the expression 158 and generated an output expression 162 that is also symbolic. The kernel 104 may represent different types of computations to be evaluated in a common format which may be referred to as an "expression."

An example of an expression is f[x, y]. The expression f[x, y] could be used to represent a mathematical function, for example. A name of the function may be f, and the function includes two arguments: x and y. An expression need not be in the form f[x, y, . . . ]. For example, x+y may also be an expression. When x+y is typed in via the front end 108, for example, the front end 108 and/or the kernel 104 may convert it to a standard form such as "Plus[x, y]". When displaying the expression "Plus[x, y]" to a user via the front end 108, for example, it could be displayed in the form "x+y". The same symbolic expression may have different possible displayed forms: Plus[x,y], x+y. In one implementation, everything sent to the kernel 104 may be formatted as an expression.

Using a standard format of expressions as described above may help maintain a structure, which can then be acted on by other expressions. A list expression such as "{a, b, c}" does not specify an operation, but it does maintain a list structure. Other expressions can operate on this structure. The expression {a, b, c} typed by a user may be converted to a standard format such as "List[a, b, c]", for example.

An expression can be thought of as a "container of data", tagged with or otherwise associated with additional information about the expression. Even though all expressions may have the same basic structure, different "types" of expressions can be differentiated by the additional information with which the expression data is tagged. Then, the kernel 104 may include rules, routine, and/or programs that treat different types of expressions in different ways.

As an example, an expression may be a list having three elements. In a memory of a computing system implementing the kernel 104, the expression may comprise three pointers indicating the addresses in the memory at which actual expressions that form the elements of the list are to be found. These expressions may in turn include pointers to their sub-expressions. The chain of pointers may end when one reaches an object such as a number or a string, which is stored directly as a pattern of bits in the memory. It may also end if an object does not reference any other objects. For example, an object may be the symbol "x", where x has not been assigned a value.

A symbol such as "x" may be represented in memory by a pointer to an entry in a table of defined symbols. This table may be a repository of information about each symbol. For example, it may include a pointer to a string giving the symbol's name, as well as pointers to expressions which give rules for evaluating the symbol.

The kernel 104 may include an evaluator configured to evaluate functions that appear in an expression. The kernel 104 may include a library of functions, each function configured to perform operations corresponding to the function, and to build a new expression representing the result. If enough functions are included in the library, a user may be able build a large number of other functions using the combinations of the library functions.

The kernel 104 may be configured to perform symbolic calculations such as symbolic integration. Such symbolic calculations may be implemented by performing systematic procedures that may not correspond to how a person might perform a symbolic procedure "by hand". Such systematic procedures may include case specific procedures as well as general procedures.

In FIG. 1, a single kernel 104 and a single front end 108 are shown. One of ordinary skill in the art will recognize that multiple kernels 104 and/or multiple front ends 108 may be utilized. For example, a single front end 108 may communicate with a plurality of kernels 104. For instance, one front end 108 may interact with a first kernel 104 until a time T, cease interaction with the first kernel 104, and then begin interacting with a second kernel 104 after the time T. Also, one front end 108 may communicate with a plurality of kernels during a single time period. Similarly, one kernel 104 may interact with multiple front ends 108. One of ordinary skill in the art will recognize many other variations.

Although the system 100 was described above as optionally being capable of evaluating non-numeric expressions such as symbolic expressions, it is to be understood that in some implementations, the system 100 may not be capable of evaluating one or more of symbolic expressions, algebraic expressions, graphic expressions, etc.

Further, the system 100 is only one example of a system that may be utilized to implement methods and techniques described below. Other example systems include a spreadsheet application, a simulation application, a control system application, an instrument application, a game application, etc.

Dynamic Objects

Examples of a type of object which will be referred to as a "dynamic object" that can be used with various types of computing software applications will now be described. A dynamic object may comprise an object whose value depends on some other underlying object. Additionally, a computing software application configured to implement dynamic objects will identify the dynamic object as being "dynamic" and re-render the dynamic object as a value of the underlying object changes without any further action from the user. In contrast, comparing to previous versions of the MATHEMATICA® software system, for example, a user would need to request explicitly (by pressing "Shift" and "Enter", for example) that the software system re-evaluate an expression after the user determined that some underlying object of the expression had changed.

In general, a dynamic object may comprise various types of objects such as a symbolic expression, a number, a table, a list, a graph, a picture, an animation, etc. Similarly, an evaluated value of a dynamic object may comprise a symbolic value, a numeric value, a plurality of values in a table, a particular graph, a particular graph, a particular animation, etc. In one embodiment, the dynamic object may be an object capable of representing a plurality of types of data (e.g., a symbolic expression, a number, a plot, etc.). For example, in the MATHEMATICA® software system, many different types of data (e.g., numbers, plots, lists, tables, equations, formulas, etc.) are represented using a common structure: an expression. Thus, a dynamic object may comprise such an expression. In other embodiments, the dynamic object may be capable of representing only one or two types of data, for example.

Figure 3A:
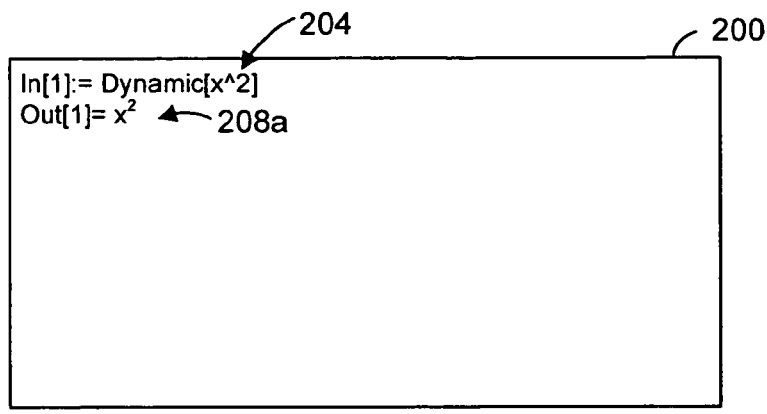
FIGS. 3A-3E are illustrations of an example interactive document in which a value of a dynamic object in the document changes.

As an example, a user may add a dynamic object to a notebook for use in a MATHEMATICA® software system configured to implement dynamic objects by using a keyword such as "Dynamic." FIG. 3A is an illustration of a portion of a notebook 200. A user has typed in "Dynamic[x^2]" and thus the software system will recognize the expression 204 as a dynamic object. Using a keyword is just one example of a technique for adding a dynamic object to a file. For example, a user could highlight, using a keyboard, mouse, trackball, etc., an expression previously entered into the notebook, and then mark the highlighted expression as a dynamic object via a menu, a button, etc. One of ordinary skill in the art will recognize many other ways in which a user can designate an object in a file as a dynamic object.

The dynamic object 204 depends on the value of an underlying object, namely the object x. The MATHEMATICA® software system is capable of evaluating symbolic expressions. Thus, in FIG. 3A, the software system has evaluated the object 204 as x2, and displayed an indication 208a of the value of the object.

Figure 3B:
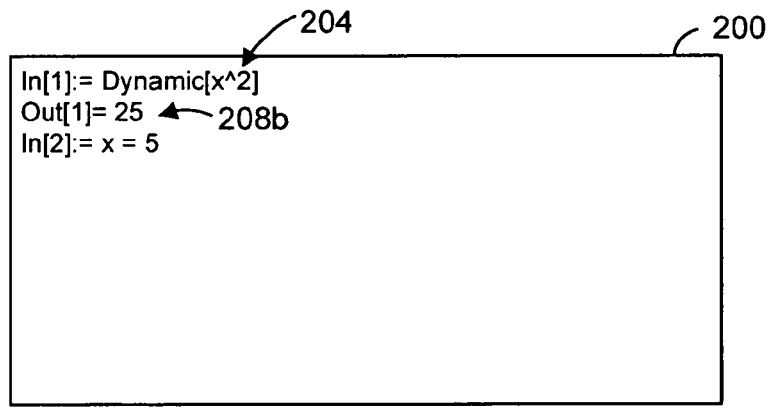

Referring now to FIG. 3B, a user has set the object x to a numeric value 5 by typing "x=5" and pressing "Shift" and "Enter". Because the value of the underlying object x has changed, the software system recalculates the dynamic object 204 and displays an indication 208b of the updated value of the dynamic object 204. The indication 208a (FIG. 3A) is no longer displayed because it no longer corresponds to the value of the dynamic object 204. In contrast, comparing to previous versions of the MATHEMATICA® software system, if the user wished for an updated value of the expression "x^2" to be rendered after the value of x had been changed, the user would have needed to request explicitly (by pressing "Shift" and "Enter", for example) that the software system reevaluate the expression "x^2".

Figure 3C:
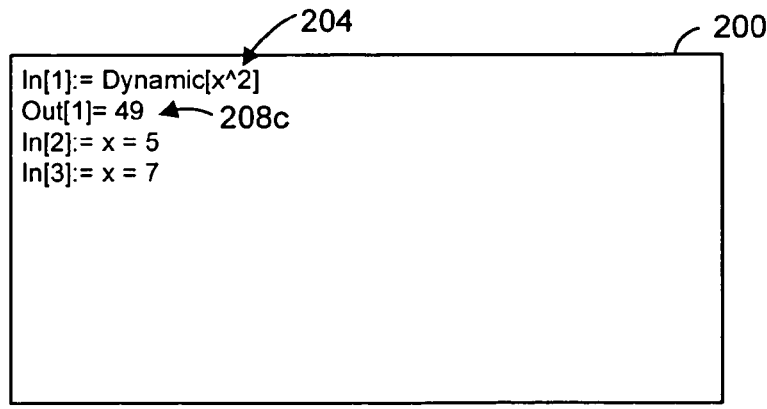

Referring now to FIG. 3C, a user has set the object x to a numeric value 7 by typing "x=7" and pressing "Shift" and "Enter". Because the value of the underlying object x has changed, the software system recalculates the dynamic object 204 and displays an indication 208c of the updated value of the dynamic object 204. The indication 208b (FIG. 3B) is no longer displayed because it no longer corresponds to the value of the dynamic object 204.

Figures 3D, 3E:
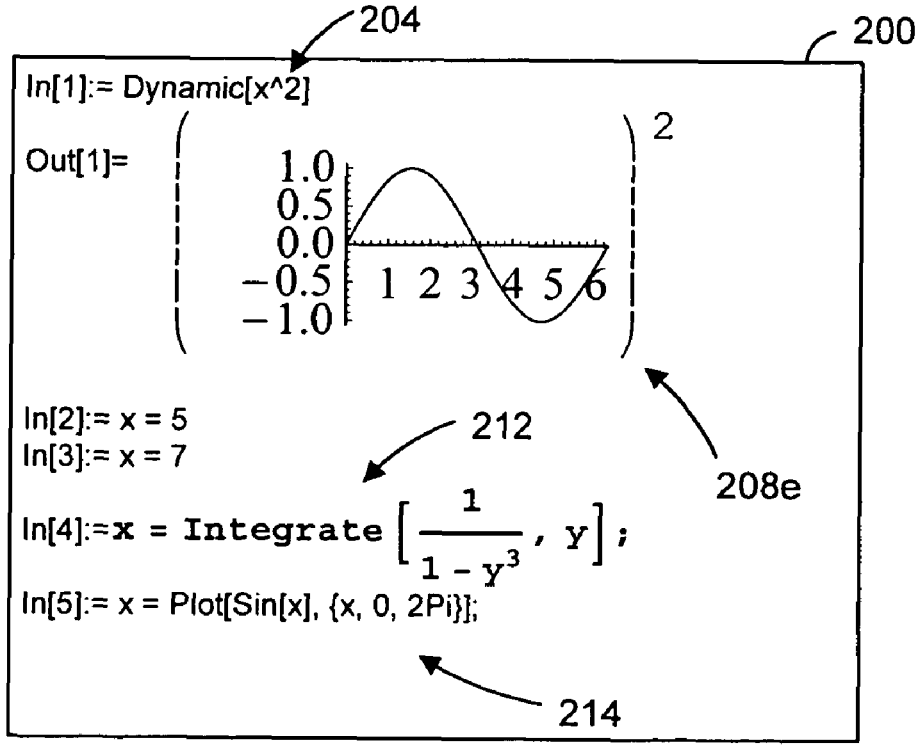

If the software system that implements dynamic objects is capable of evaluating symbolic expressions, then the software system may be capable of implementing dynamic objects that may take on symbolic values. Referring now to FIG. 3D, a user has set the object x to a symbolic equation 212. Because the value of the underlying object x has changed to a symbolic value, the software system recalculates the dynamic object 204 and displays an indication 208d of the updated value (a symbolic value) of the dynamic object 204. The indication 208c (FIG. 3C) is no longer displayed because it no longer corresponds to the value of the dynamic object 204.

If the software system that implements dynamic objects is capable of evaluating plot expressions, then the software system may be capable of implementing dynamic objects that may take on plot values. Referring now to FIG. 3E, a user has set the object x to a plot of sin(x) by typing in the text 214. Because the value of the underlying object x has changed, the software system recalculates the dynamic object 204 and displays an indication 208e of the updated value of the dynamic object 204. The indication 208d (FIG. 3D) is no longer displayed because it no longer corresponds to the value of the dynamic object 204.

Figure 4A:
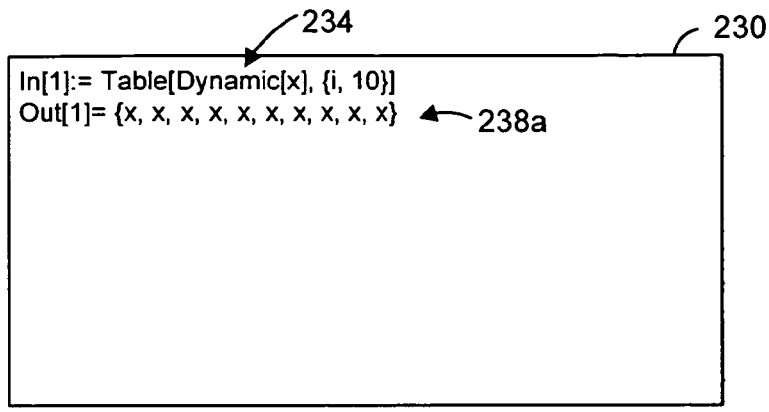
FIGS. 4A-4C are illustrations of an example interactive document in which values in a table change.

FIG. 4A is an illustration of a portion of a notebook 230 that renders a table having dynamic objects as its elements. If a dynamic object is an element, attribute, component, etc., of some other object, the software system may determine the other object as dynamic itself. For example, if a dynamic object is an element of a table to be rendered, the software system may determine the table itself as a dynamic object. Then, the software system may dynamically render the table when an underlying object changes.

In the notebook 230, a user has typed in "Table[Dynamic [x], {i, 10}]" and thus the software system will recognize the expression 234 as a dynamic object. The software system evaluated the object 234 as a table having ten elements, each element having the value "x". An indication 238a of the table is displayed. A similar result could be obtained by typing in "Dynamic[Table[x, {i, 10}]]".

Figure 4B:
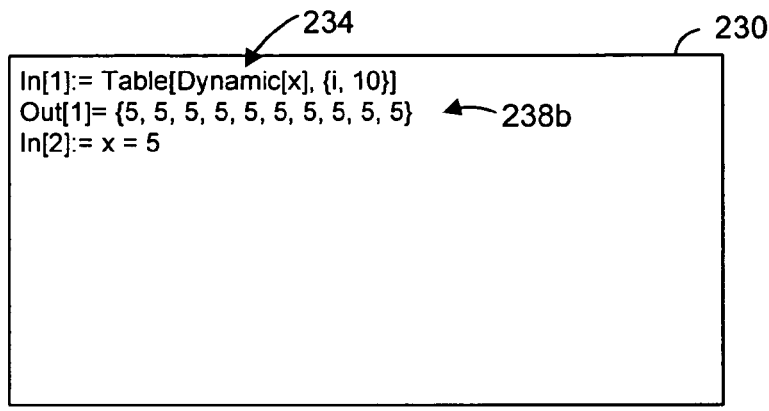

Referring now to FIG. 4B, a user has set the object x to a numeric value 5 by typing "x=5" and pressing "Shift" and "Enter". Because the value of the underlying object x has changed, the software system recalculates the dynamic object 234 and displays an indication 238b of the updated value of the dynamic object 234. Namely, a table having elements "5" is displayed. The indication 238a (FIG. 4A) is no longer displayed because it no longer corresponds to the value of the dynamic object 234.

Figure 4C:
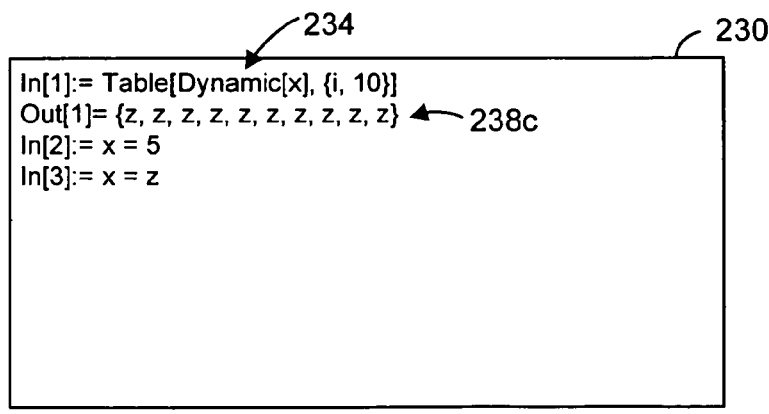

Referring now to FIG. 4C, a user has set the object x to symbolic value z by typing "x=z" and pressing "Shift" and "Enter". Because the value of the underlying object x has changed, the software system recalculates the dynamic object 234 and displays an indication 238c of the updated value of the dynamic object 234. Namely, a table having elements "z" is displayed. The indication 238b (FIG. 4B) is no longer displayed because it no longer corresponds to the value of the dynamic object 234.

Figure 5:
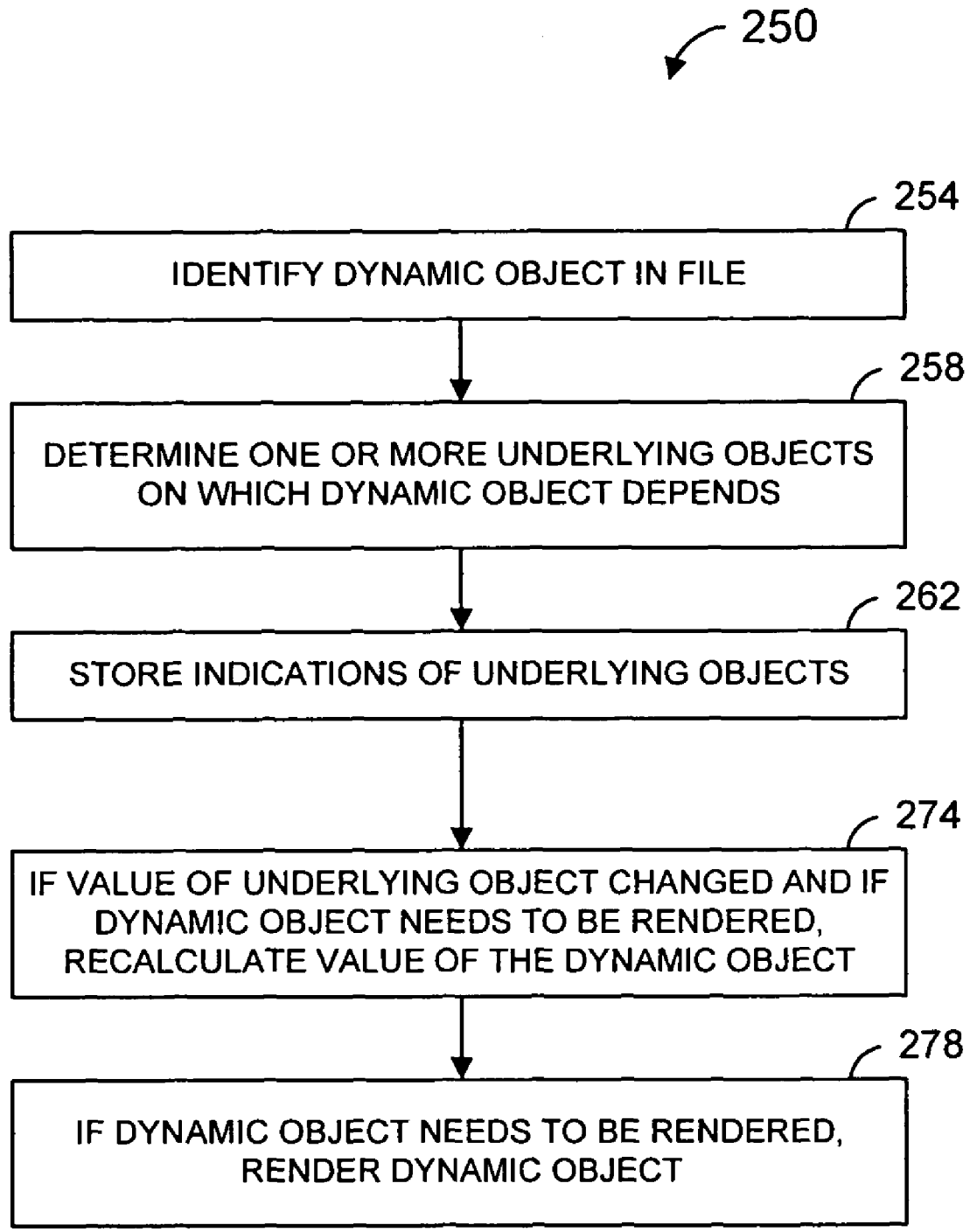
FIG. 5 is a flow diagram of an example method for rendering a dynamic object to a user.

FIG. 5 is a flow diagram of an example method 250 for implementing dynamic objects. The method 250 can be implemented by a computing system such as the computing system 100 of FIG. 1, and will be described with reference to FIG. 1 for explanatory purposes. It will be understood by those of ordinary skill in the art, however, that the example method 250 can be implemented by other types of systems as well.

At a block 254, a dynamic object in a file may be identified. In the example system 100, the front end 108 may identify dynamic objects. In general, the dynamic object may be identified in a variety of ways that may depend on how the system indicates objects as dynamic. For example, if a keyword such as "Dynamic" is used, a computing application may identify dynamic objects by identifying the keyword in the file. More generally, the computing application may look for dynamic object indicators associated with objects to identify dynamic objects.

As illustrated in FIGS. 3A-E, a dynamic object can have a numeric or some other type of value, such as a symbolic value. Optionally, the type of values that the dynamic object has may change. For example, in FIGS. 3A and 3B, the value of the dynamic object changed from a symbolic value to a numeric value. The file in which the dynamic object resides may comprise a variety of types of files. For example, the file could comprise a file formatted for use with a computing application (e.g., a notebook file used with MATHEMATICA® software systems), a text file, a file formatted for use with a word processing application, a file formatted for use with a spreadsheet application, etc.

Referring again to FIG. 5, at a block 258, one or more underlying objects on which the dynamic object depends may be determined. In the example system 100, the kernel 104 may determine the underlying objects. Determining the underlying objects may comprise determining what objects are used to evaluate the dynamic object, and determining what objects are used to evaluate the dynamic object may comprise analyzing the object itself and/or information associated with the dynamic object. In FIGS. 3A, 3B, and 3C, the dynamic object depends on the object x. This may be determined by analyzing the dynamic object itself, which includes "x^2", for example.

Referring again to FIG. 5, at a block 262, indications of the underlying objects determined at the block 258 may be stored. In the example system 100, the kernel 104 may store the indications of the underlying objects. The stored indications may be associated with the underlying objects and/or with the dynamic object. In the example of FIGS. 3A, 3B, and 3C, and indication that the dynamic object "x^2" depends on the object "x" may be associated with the object "x" and/or with the dynamic object "x^2".

At a block 274, if a value of an underlying object has changed and if the dynamic object needs to be rendered, the value of the dynamic object may be recalculated. In the example system 100, the kernel 104 may determine if an underlying object has changed. Determining if an underlying object has changed may comprise analyzing information associated with a recently changed object to see if any dynamic objects depend on the object. In the example system 100, when the kernel 104 changes the value of an object, the kernel may analyze information associated with the object to determine if there are any indicators, such as indications stored at the block 262, indicating that one or more dynamic objects depend on the object.

Determining if an underlying object has changed may additionally or alternatively comprise analyzing information associated with a dynamic object that is to be redrawn on the screen to determine on which underlying objects it depends. In the example system 100, when a screen having a dynamic object is to be redrawn, the front end 108 may analyze information associated with the dynamic object to determine if there are any indicators, such as indications stored at the block 262, indicating that it depends on one or more underlying objects. Then, the front end 108 could poll the kernel 104 to determine if values of any of the one or more objects had changed.

In the example system 100, the front end 108 may determine if the dynamic object needs to be rendered. Determining if the dynamic object needs to be rendered may comprise, for example, determining if a display screen on which the dynamic object is located should be refreshed.

In the example system 100, the kernel 104 may recalculate the value of the dynamic object and then provide the value to the front end 108. Then, at a block 278, an indication of the recalculated value of the dynamic object is rendered to a user. In the example system 100, the front end 108 may cause an indication of the recalculated value to be rendered. For example, an indication of the value of the object could be displayed on a display screen.

One of ordinary skill in the art will recognize that the method 250 may be modified. For instance, one or more blocks could be modified, one or more blocks could be omitted, blocks could be combined and/or reordered, additional blocks could be added, etc. As just one example, the block 274 could be modified so that the value of the dynamic object is recalculated even if the dynamic object does not need to be rendered.

Figure 5A:
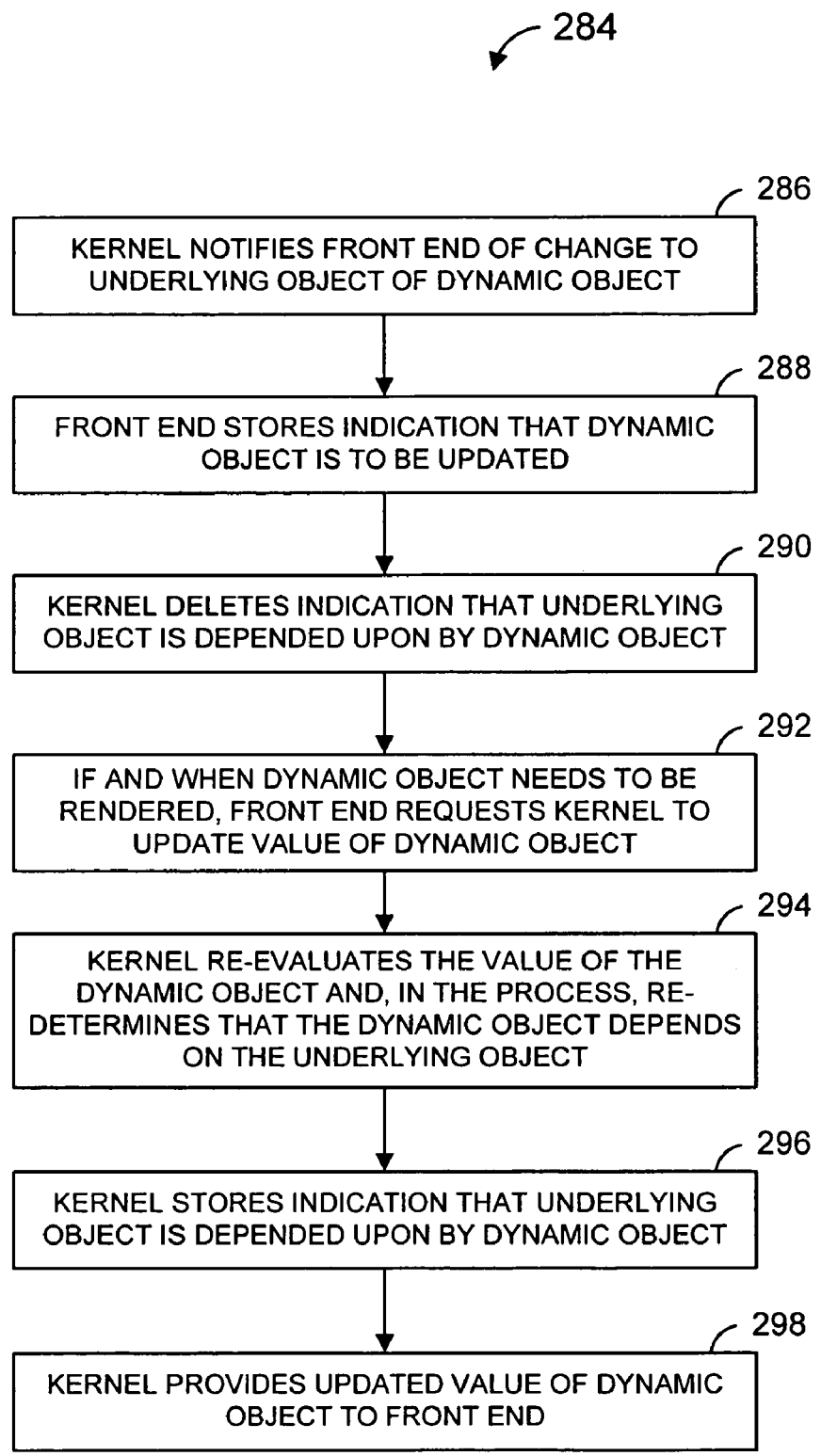
FIG. 5A is a flow diagram of example method for determining if a dynamic object should be recalculated.

FIG. 5A is a flow diagram of an example method 284 for implementing a portion of the method 250 of FIG. 5. For example, the method 284 is one possible implementation of at least portions of the blocks 262 and 274 of FIG. 5. The method 284 is an example of a method that may help reduce the computational burden of the system 100 by reducing the number of times that the dynamic object is actually updated when the underlying object is changing. For example, even though the underlying object may be changing a large number times between each display screen refresh, the dynamic object may only be updated at a much slower rate such as the screen refresh rate. Alternatively, the dynamic object could be updated a different rate such as a rate even slower than the screen refresh rate, a rate slightly faster than the screen refresh rate, etc.

The method 284 can be implemented by a computing system such as the computing system 100 of FIG. 1, and will be described with reference to FIG. 1 for explanatory purposes. The method 284 may be implemented each time it is detected that an underlying object has changed, where the underlying object is depended upon by a dynamic object. For example, the kernel 104 may have stored an indication associated with the underlying object that a dynamic object depends upon it, and may have detected that the underlying object changed.

At a block 286, the kernel 104 notifies the front end 108 that the underlying object changed and that the dynamic object depends on the underlying object. At a block 288, the front end 108 stores an indication that the dynamic object is to be updated. Additionally, the front end 108 may store an indication that the dynamic object depends on the underlying object. After notifying the front end 108 at the block 286, the kernel 104 may then delete its stored indication of the dependency of the dynamic object upon the underlying object at a block 290. Thus, the kernel need no longer spend computational resources regarding notifying the front end 108 of changes to the underlying object. Additionally, by deleting the indication of dependency, the kernel avoids having to maintain a potentially very large list of dependencies of all the dynamic objects.

Because of the indication stored at the block 288 by the front end 108, the front end 108 is aware that the dynamic object should be updated if and when it is to be rendered next. Thus, at a block 292, if and when the dynamic object is to be rendered, the front end 108 causes the value of the dynamic object to be updated. The front end 108 could request the kernel 104 to update the dynamic object.

At a block 294, the kernel 104 may re-evaluate the value of the dynamic object. Additionally, in the process of reevaluate the value of the dynamic object, the kernel 104 may re-determine the underlying objects on which the dynamic object depends. Then, the kernel 104 may store an indication that the underlying object is depended upon by the dynamic object at a block 296. At a block 298, the kernel 104 may provide the front end 108 with the updated value of the dynamic object.

When the kernel 104 next detects that the underlying object has changed, the method 284 may be repeated.

One of ordinary skill in the art will recognize that the method 284 may be modified. For instance, one or more blocks could be modified, one or more blocks could be omitted, blocks could be combined and/or reordered, additional blocks could be added, etc. Additionally, an entirely different method may be utilized to implement the example method 250 of FIG. 5. For example, if the method is implemented by a system that does not include a kernel and a front end structure, a different method may be utilized.

Dynamic Objects and Controls

Figure 6A:
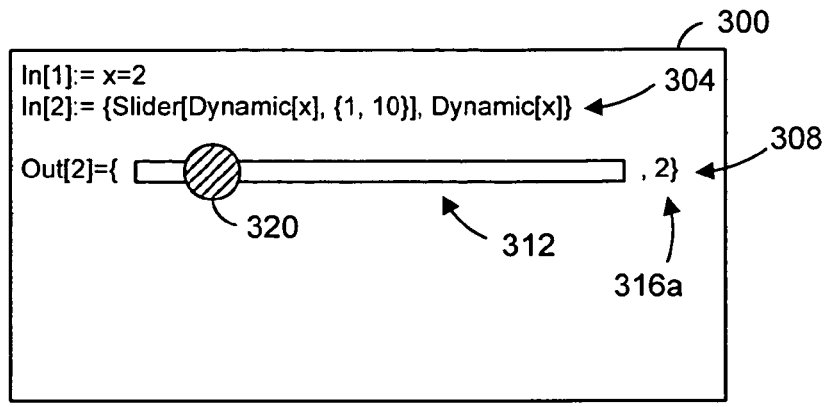
FIGS. 6A-6C are illustrations of an example interactive document in which a position of a slider is dynamically linked to an underlying object.

Dynamic objects may also be used with graphical user interface (GUI) controls or mechanisms such as sliders, wheels, buttons, etc. For example, a dynamic object may be linked to a GUI control such that a change in the value of the dynamic object causes some change to the GUI control. Additionally, the dynamic object and the GUI control may be linked such that a manipulation of the GUI control by a user may cause the value of the dynamic object to change. FIG. 6A is an illustration of a portion of a notebook 300 that utilizes a slider control. The slider may be created in a variety of ways. In the example notebook 300, a slider control is created using a command "Slider". A first argument of the Slider command is a position of a knob on the slider. In the notebook 300, the position of the knob is specified as corresponding to a dynamic object, namely "Dynamic[x]". In this configuration the dynamic object is linked to the position of the slider such that a change to the value of "Dynamic[x]" affects the position of the slider, and vice versa.

A second argument of the Slider command is a range of values to which the slider corresponds. In the notebook 300, the range is specified as "{1, 10}". With such a specified range, the leftmost position of the knob may correspond to "1" and the rightmost position of the knob may correspond to "0", for example.

In the notebook 300, a variable x has been set to 2. Additionally, a line 304 specifies a list that is to be evaluated. The list includes the slider as a first element, and the dynamic object "Dynamic[x]" as the second component. The software system evaluated the line 304 and generated a list 308. The list includes a slider 312 and an indication 316a of the value of the dynamic object "Dynamic[x]". The slider 312 includes a knob 320, which is in a position corresponding to 2, because the knob position is set to the value of the dynamic object "Dynamic[x]", and x has been set to 2.

Figure 6B:
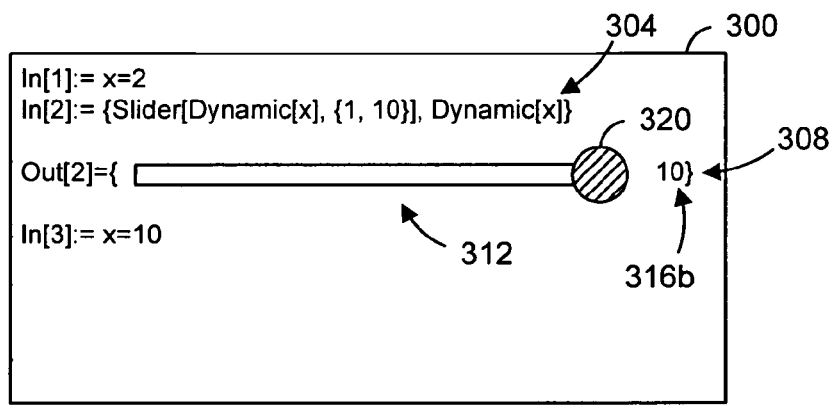

FIG. 6B is an illustration of the notebook 300 after a user has set x to the value 10. In response, the software system redrew the knob 320 in a position corresponding to the updated value of the dynamic object "Dynamic[x]". Additionally, the computer system redrew the portion of the notebook 300 to include an indication 316b of the updated value of the dynamic object "Dynamic[x]".

Figure 6C:
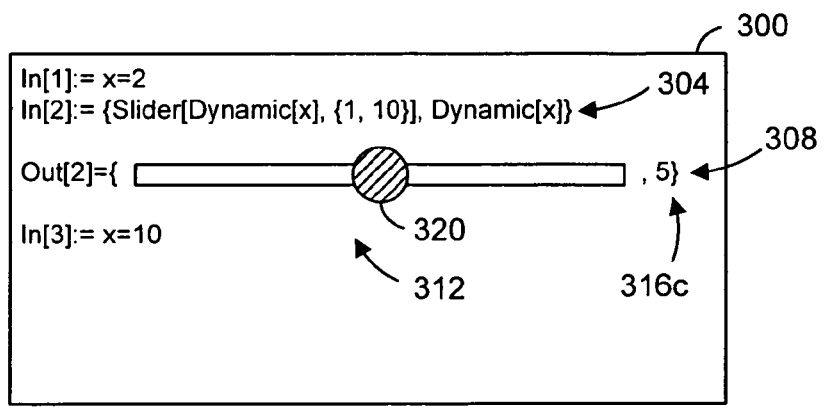

FIG. 6C is an illustration of the notebook 300 after a user has moved the knob 320. For example, the user could select the knob 320 (e.g., via a mouse, a trackball, a touchpad, a touch screen, etc.) and then drag the knob 320 to its new position. In response, the software system redrew the knob 320 is in its new position. Because the position of the knob 320 is linked to the dynamic object "Dynamic[x]", the value of the dynamic object changes as the knob 320 is moved by the user. Thus, the computer system redrew the portion of the notebook 300 to include an indication 316c of the updated value of the dynamic object "Dynamic[x]". The computer system may redraw the notebook or a portion of the notebook many times as the knob 320 is being moved by the user, and the indication 316 may rapidly change to indicate the changing values of x.

Figure 7A:
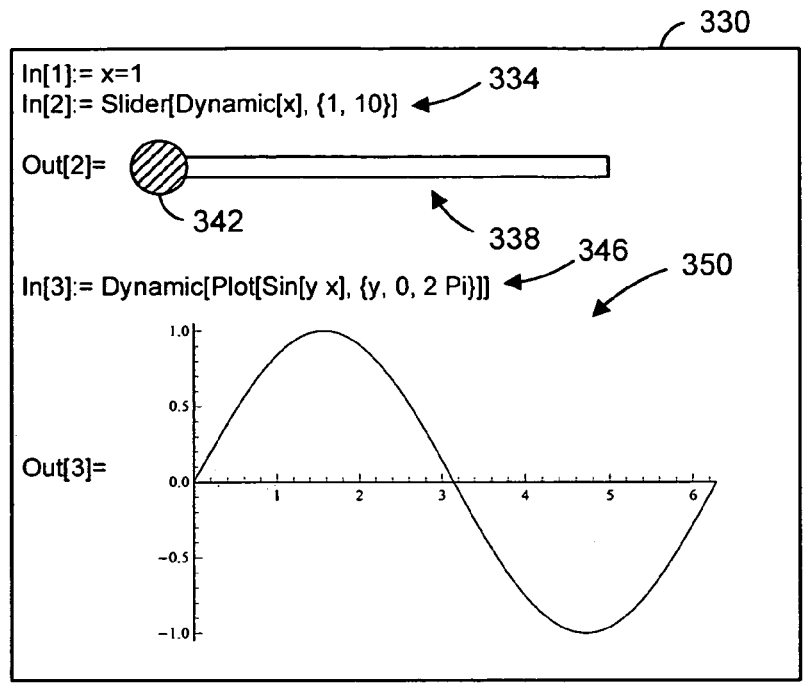
FIGS. 7A-7B are illustrations of an example interactive document in which a position of a slider is dynamically linked to a plot of a function.

A GUI mechanism also can be linked to non-numeric dynamic objects such as symbolic objects, plots, graphics, animations, etc. FIG. 7A is an illustration of a portion of a notebook 330 that utilizes a slider control in conjunction with a plot. In the notebook 330, a variable x has been set to 1. Additionally, a line 334 specifies the slider to be created. A position of a knob of the slider is to be a dynamic object "Dynamic[x]". The software system evaluated the line 334 and generated a slider 338 having a knob 342. The knob 342 is in a position corresponding to 1, because the knob position is set to the value of the dynamic object "Dynamic[x]", which has been set to 1.

A line 346 specifies another dynamic object to be created: a plot. The plot is of the function "Sin [y x]" for values of y between 0 and $2\pi$. Because the plot specified by the line 346 is to be a dynamic object, the software system may update it upon changes in any underlying objects. In this case, the variable x may be changed via the slider 338 for example. The software system evaluated the line 346 and generated a plot 350, which corresponds to a plot of Sin [x y] where x=1.

Figure 7B:
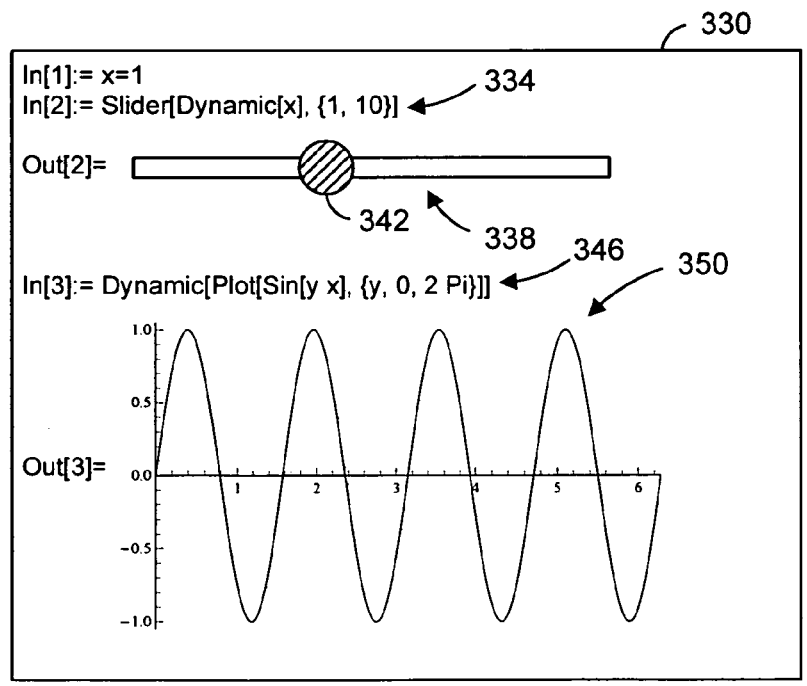

FIG. 7B is an illustration of the portion of a notebook 330 after a user has moved the knob 342 to a position corresponding to 4. In response, the software system updated the value of x to 4. Further, the software system updated the plot 350 such that it corresponds to a plot of Sin [x y] where x=4. The computer system may redraw the notebook or a portion of the notebook many times as the knob 342 is being moved by the user, and the plot 350 may rapidly change to indicate the changing values of x.

Figure 8A:
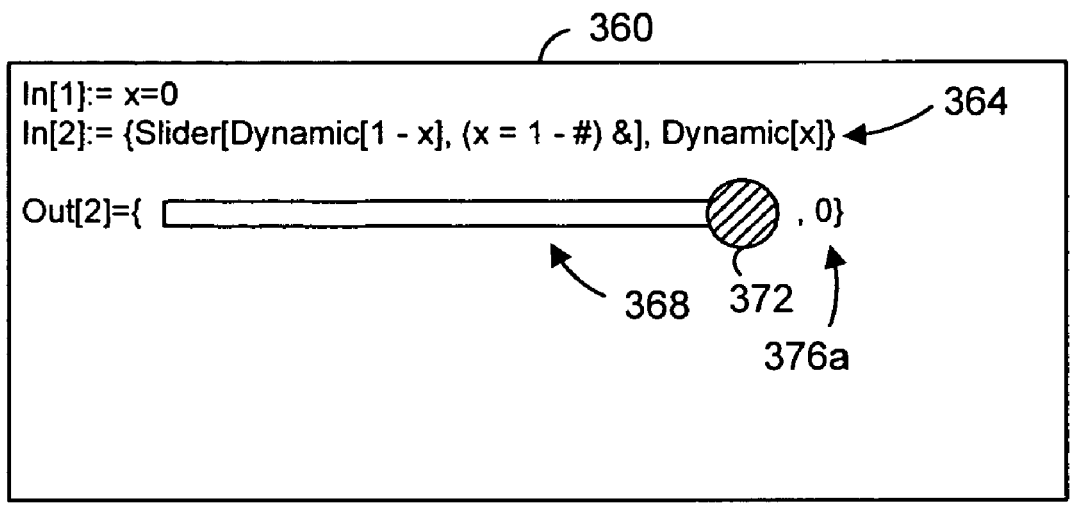
FIGS. 8A-8B are illustrations of an example interactive document in which a position of a slider is dynamically linked to a function of an underlying object.

A state of a GUI mechanism (e.g., a position of a slider) also can be linked to a function of an underlying object. As just one example, a value of an underlying object may be determined based on some function of a knob position of the slider, and not merely on the knob position itself. FIG. 8A is an illustration of a portion of a notebook 360 in which a knob position of a slider is dynamically dependent upon a function of an underlying object. In the notebook 360, a line 364 specifies the slider to be created. A position of a knob of the slider is to be the dynamic object "Dynamic[1-x, (x=1-#) &]". The first argument of the Dynamic command indicates a first function specifying how to determine a value of the dynamic object based on the underlying object x. Namely, the value of the dynamic object is to be determined as 1-x. The second argument of the Dynamic command indicates a second function specifying how to determine the value of the underlying object x based on the dynamic object. Namely, the value of the object x is to be determined as one minus the value of the dynamic object. (The symbol "&" is used in MATHEMATICA® software systems to indicate that preceding text is a function and that an argument to the function is indicated by the symbol "#"). Thus, the Slider command in line 364 indicates that when a valued of the underlying object x changes, the position of a knob of the slider is to be determined as 1−x. Additionally, the Slider command in line 364 indicates that when a user changes the position of the knob, the value of the underlying object x is to be changed according to the equation: x=one minus the knob position. Thus, the Slider command in the line 364 specifies a bidirectional relationship between the underlying object x and the knob position.

The software system evaluated the line 364 and generated a slider 368 having a knob 372, as well as an indicator 376a of the value of the underlying object x. The left-most position of the knob 372 corresponds to a knob position of zero, and the right-most position of the knob 372 corresponds to a knob position of one. The knob 372 is in a position corresponding to one, because the knob position is set to the value of the dynamic object "Dynamic[1−x . . . ]", and x has been set to 0.

Figure 8B:
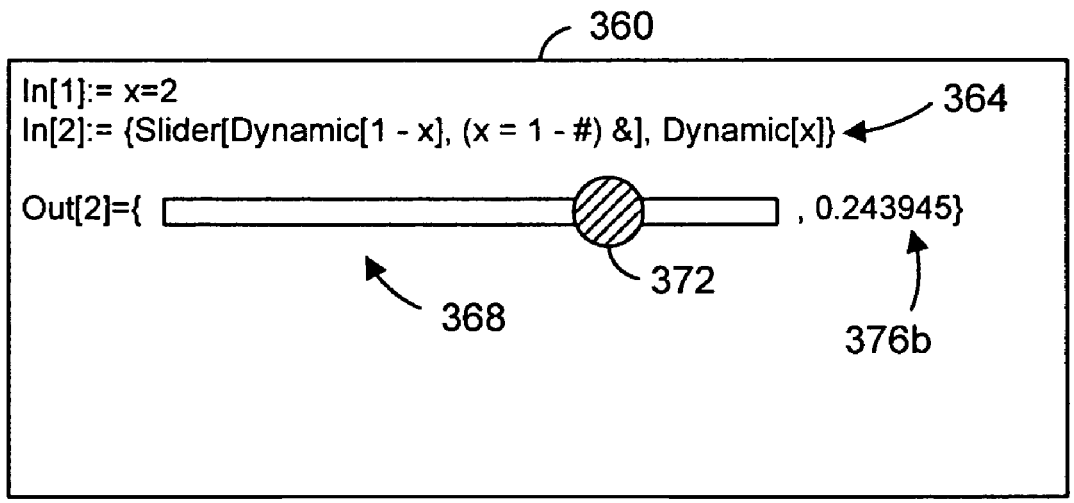

FIG. 8B is an illustration of the portion of the notebook 360 after a user moved the knob 372 to a position corresponding to 0.756055. In response, the software system updated the value of x to 0.243945 according to the equation: x=1 minus the knob position. Further, the software system displayed the indication 376b of the new value of the underlying object x. The computer system may redraw the notebook or a portion of the notebook many times as the knob 372 is being moved by the user, and the indication 376 may rapidly change to indicate the changing values of x.

Figure 9:
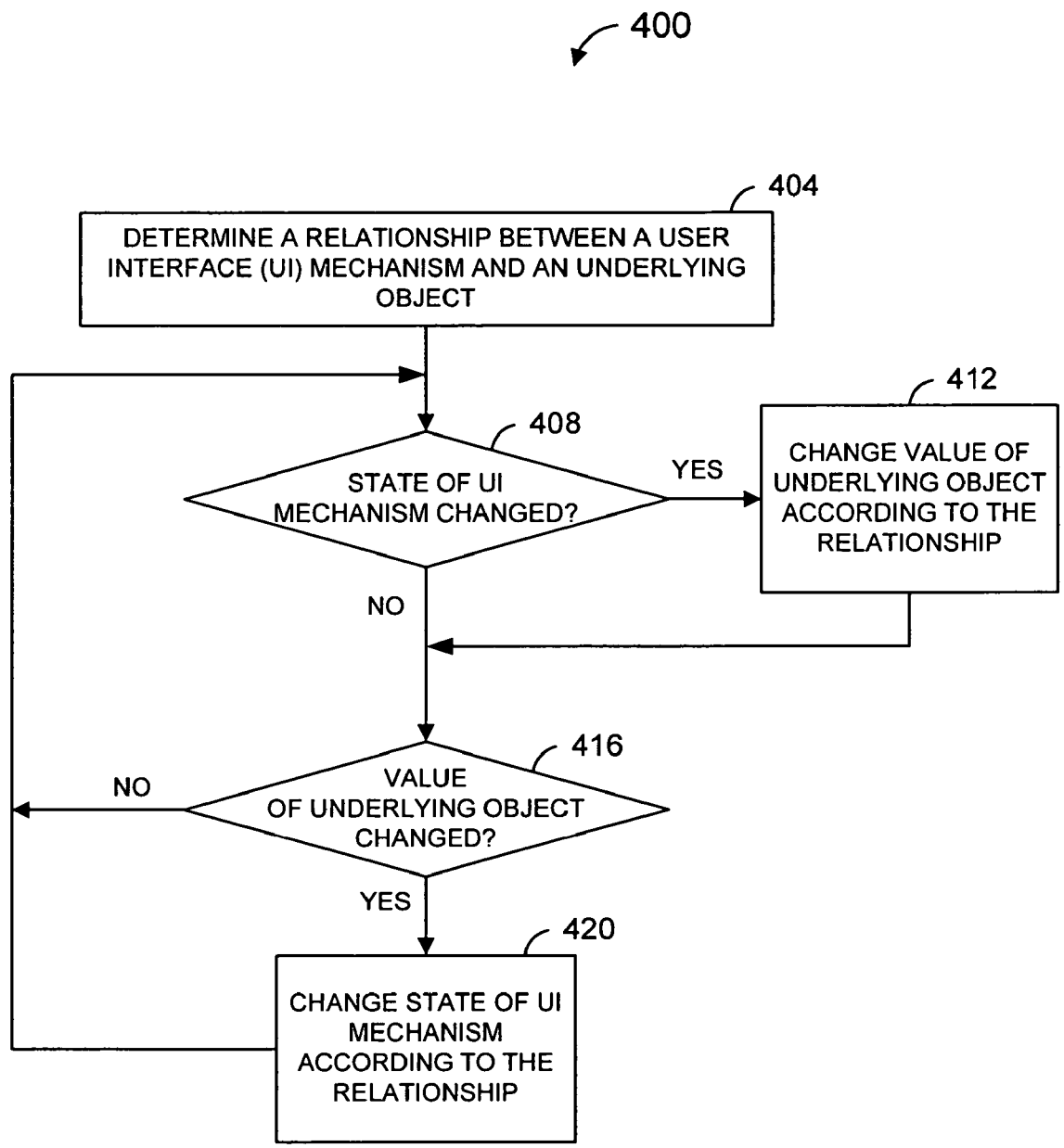
FIG. 9 is a flow diagram of an example method for implementing a user interface mechanism that is dynamically linked with an underlying object.

FIG. 9 is a flow diagram of an example method 400 for implementing a user interface (e.g., a GUI or mechanical user interface) mechanism that is dynamically linked with an underlying object. The method 400 can be implemented by a computing system such as the computing system 100 of FIG. 1, and will be described with reference to FIG. 1 for explanatory purposes. It will be understood by those of ordinary skill in the art, however, that the example method 400 can be implemented by other types of systems as well.

At a block 404, a relationship between states of a user interface mechanism located on a workspace (e.g., a notebook used with MATHEMATICA® software systems, a spreadsheet, a simulation display, a control system interface, a software instrument, a game, etc.) and an underlying object is determined. The user interface mechanism may comprise, for example, GUI mechanisms such as a slider, a wheel, buttons, input fields, etc., or mechanical user interface mechanisms such as a mechanical slider, a joystick, a wheel, etc., with force feedback. States of the GUI mechanism may comprise a position of a knob, a position of the wheel, which buttons are depressed, value of an input field, etc. In the example system 100, the kernel 104 and/or the front end 108 may determine the relationship by, for example, evaluating commands in a file such as a notebook, a text file, etc. Referring to FIG. 6A, the kernel 104 and/or the front end 108 may determine the relationship between the position of the knob 320 of the slider 312 and the underlying object x by analyzing the line 304. In particular, the position of the knob 320 is dynamically dependent upon the value of x. Referring to FIG. 8A, the front end 108 may determine the relationship between the position of the knob 372 of the slider 368 and the underlying object x by analyzing the line 364. In particular, when the value of x changes, the position of the knob 372 is to be determined as 1−x, and when the position of the knob is changed by a user, the value of x is to be determined as one minus the knob position.

Referring again to FIG. 9, at a block 408, it may be determined if a state of the user interface mechanism changed. In the example system 100, the front end 108 may determine if a state of the user interface mechanism changed. Referring to FIGS. 6A, 6B, and 6C, the front end 108 may determine if a user has adjusted the position of the knob 320 using a variety of techniques well known to those of ordinary skill in the art.

Referring again to FIG. 9, if a state of the user interface mechanism changed, then at a block 412, the value of the underlying object may be changed according to the relationship determined at the block 404. In the example system 100, the kernel 104 may change the value of the underlying object. For example, the front end 108 could provide the kernel 104 with an indication of the relationship as well as an indication of the new state of the user interface mechanism. In response, the kernel 104 could update the value of the underlying object. Optionally, the front end 108 may update the value of the underlying object. For example, front end 108 could update the value of the underlying object if the relationship between the state of the user interface mechanism and the underlying object is relatively straightforward. But if the relationship is complex, the front end 108 could provide the kernel 104 with an indication of the relationship as well as an indication of the new state of the user interface mechanism and let the kernel 104 determine the updated value of the underlying object.

At a block 416, it may be determined if the value of the underlying object changed. In the example system 100, the kernel 104 may notify the front end 108 if the value of the underlying object changed and may provide the front end 108 with the new value. Alternatively, if the front end 108 updated the underlying object itself, it would then know when the underlying object changed. If the value of the underlying object changed, then at a block 420, the state of the user interface mechanism may be changed according to the relationship determined at the block 404. In the example system 100, the front end 108 may change the state of the user interface mechanism. In FIG. 6B, for example, the front end 108 could redraw the knob 320 at a new position when the kernel 104 notifies the front end 108 that the value of the object x changed and provides the new value of the object x. Optionally, the state of the user interface mechanism may only be changed if it is determined that the user interface mechanism is to be rendered. For example, the value of the underlying object may change many times in between screen refreshes. Thus, in order to conserve computational capacity, the state of a GUI mechanism may only be updated when the screen needs to be refreshed.

The flow related to blocks 408, 412, 416, and 420 may be repeated to monitor changes in the underlying object and/or states of the user interface mechanism.

One of ordinary skill in the art will recognize that the method 400 may be modified. For instance, one or more blocks could be modified, one or more blocks could be omitted, blocks could be combined and/or reordered, additional blocks could be added, etc.

Dynamic Objects and Graphics

As discussed above, dynamic objects may also be used with in conjunction with graphics. For example, dynamic objects may be utilized to specify graphics primitive information (e.g., particular graphics primitives to be rendered, coordinates of graphics primitives, attributes of graphics primitives, etc.) or other information on which a rendering of the graphic object depends.

Figure 10A:
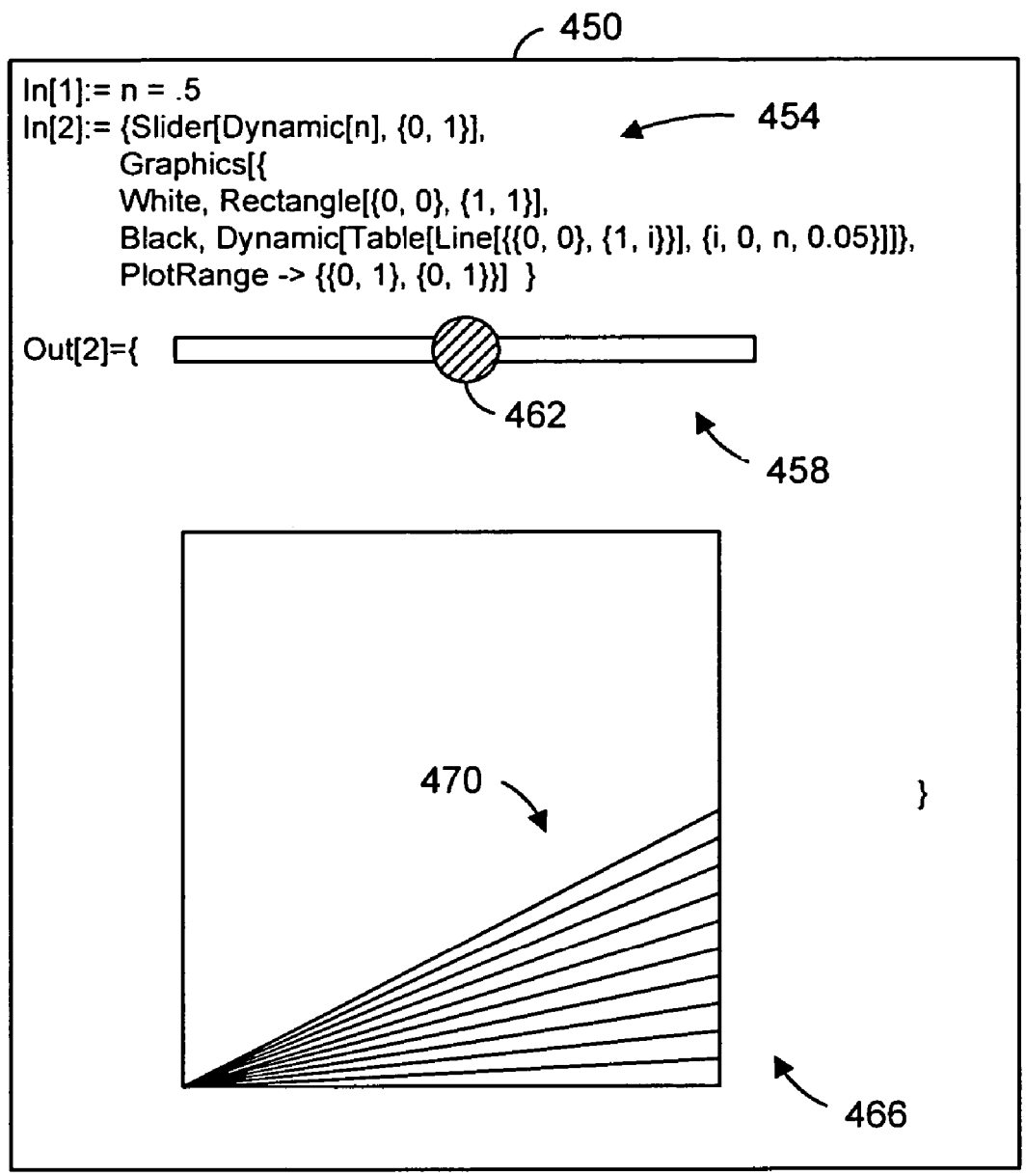
FIGS. 10A-10B are illustrations of an example interactive document in which a position of a slider is dynamically linked to a graphics object.

FIG. 10A is an illustration of a portion of a notebook 450 in which a knob position of a slider determines how many lines are drawn in a graphic. In the notebook 450, the text 454 specifies the slider to be created. A position of a knob of the slider is to be the dynamic object "Dynamic[n]". Additionally, the text 454 specifies a graphic to be created in which a number of lines is dynamically dependent upon n.

The software system evaluated the text 454 and generated a slider 458 having a knob 462. The left-most position of the knob 462 corresponds to a knob position of zero, and the right-most position of the knob 462 corresponds to a knob position of one. The knob 462 is in a position corresponding to 0.5, because the knob position is set to the value of the dynamic object "Dynamic[n]", and n has been set to 0.5.

The software system also generated the graphic 466 having lines 470. A number of the lines based on n, where n=0.5.

Figure 10B:
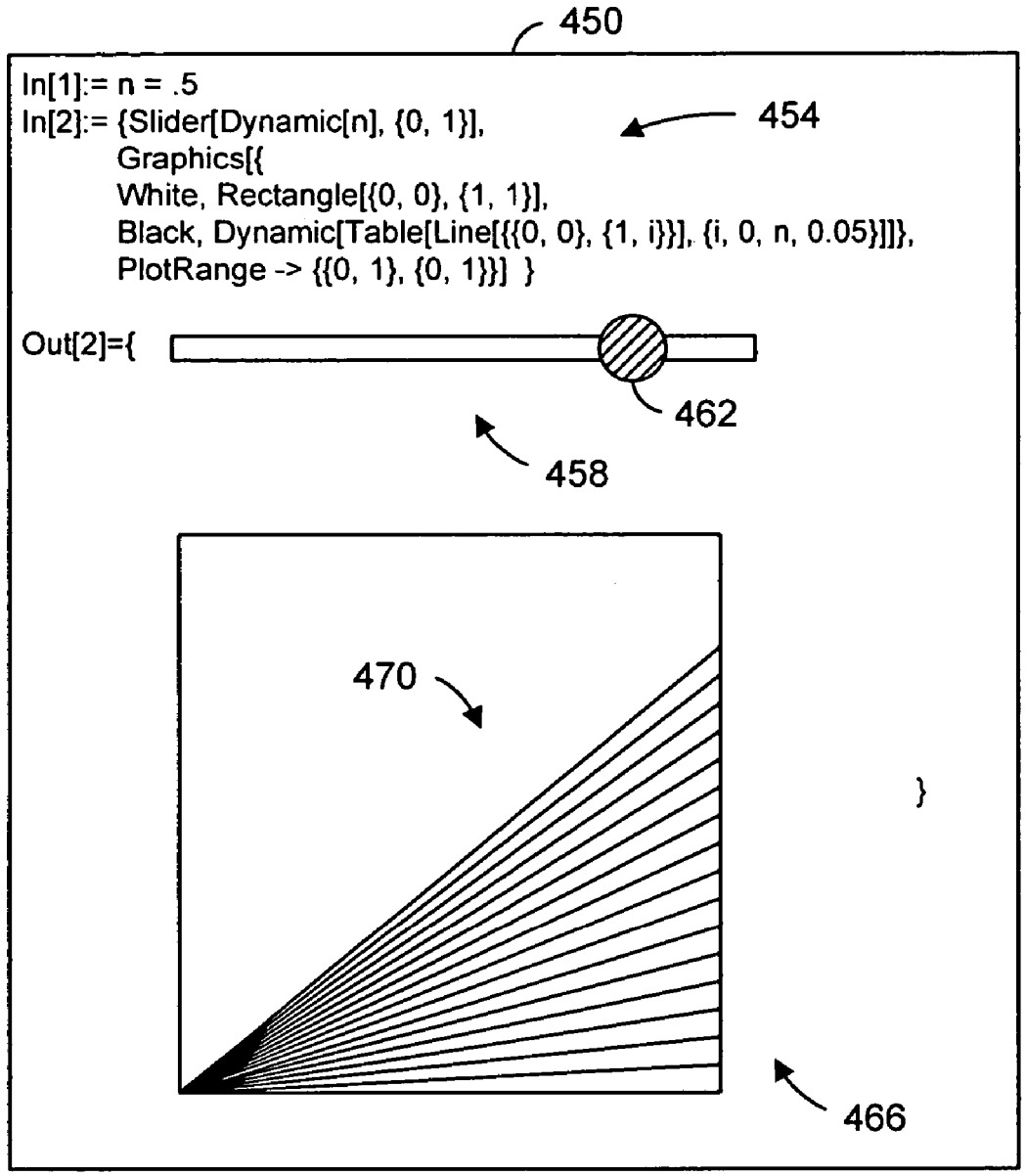

FIG. 10B is an illustration of the portion of the notebook 450 after a user has moved the knob 462 of the slider 458. In response, the value n has been modified. Additionally, because n has been modified and because n is dynamically linked to the number of the lines 470 to be drawn in the graphic 466, the number of lines is different than in FIG. 10A and reflects the changed value of n. The computer system may redraw the notebook or a portion of the notebook many times as the knob 462 is being moved by the user, and the graphic 466 may rapidly change to indicate the changing values of n.

Figure 11A:
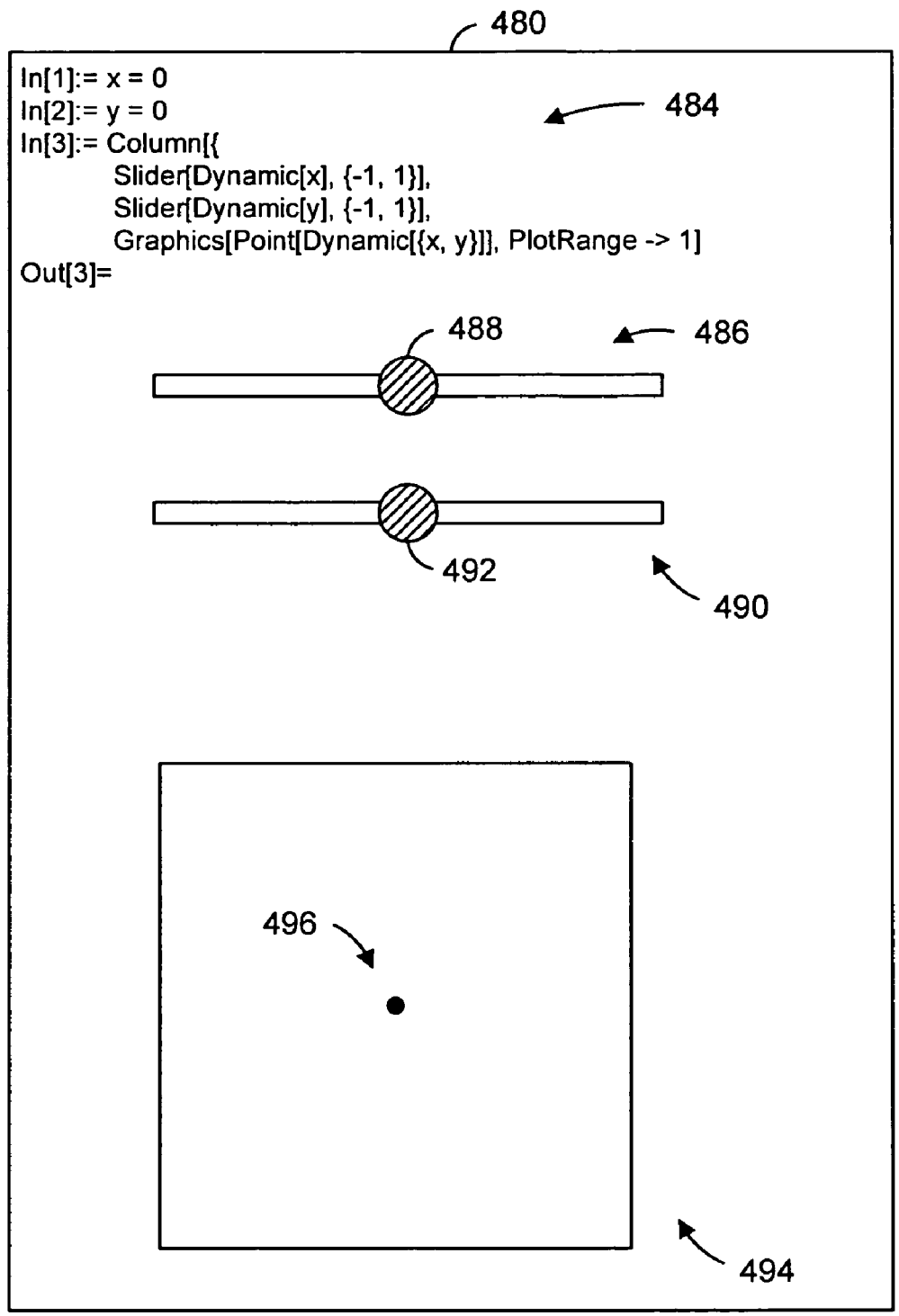
FIGS. 11A-11B are illustrations of an example interactive document in which a position of a point is dynamically linked to two sliders.

A manipulation of a graphic also can be linked to an underlying object. FIG. 11A is an illustration of a portion of a notebook 480 in which knob positions of two sliders determine the position of a point in a graphic. Conversely, a user can directly move the position of the point, and new positions of the moved point determine new knob positions of the two sliders. For example, a user can select the point in the graphic and then drag the point to a new position. In response, as the point is moved, the software system will move the slider knobs corresponding to the new positions of the point.

In the notebook 480, the text 484 specifies two sliders to be created. A position of a knob of a first slider is to be the dynamic object "Dynamic[x]". A position of a knob of a second slider is to be the dynamic object "Dynamic[y]". Additionally, left-most positions of the sliders are to correspond to −1, and right-most positions are to correspond to +1. Further, the text 484 specifies a graphic to be created in which a position of a point is dynamically dependent upon positions of the sliders, and vice versa.

The software system evaluated the text 484 and generated a slider 486 having a knob 488, and a slider 490 having a knob 492. Further, the software system generated a graphic 494 depicting a single point 496. The knob 488 is in a position corresponding to 0, because the knob position is set to the value of the dynamic object "Dynamic[x]", and x has been set to 0. The knob 492 is in a position corresponding to 0, because the knob position is set to the value of the dynamic object "Dynamic[y]", and y has been set to 0. The point 496 is at a position corresponding to the coordinates (0, 0) because the coordinates of the point were set to "Dynamic[{x, y}]", and x and y have both been set to zero.

Figure 11B:
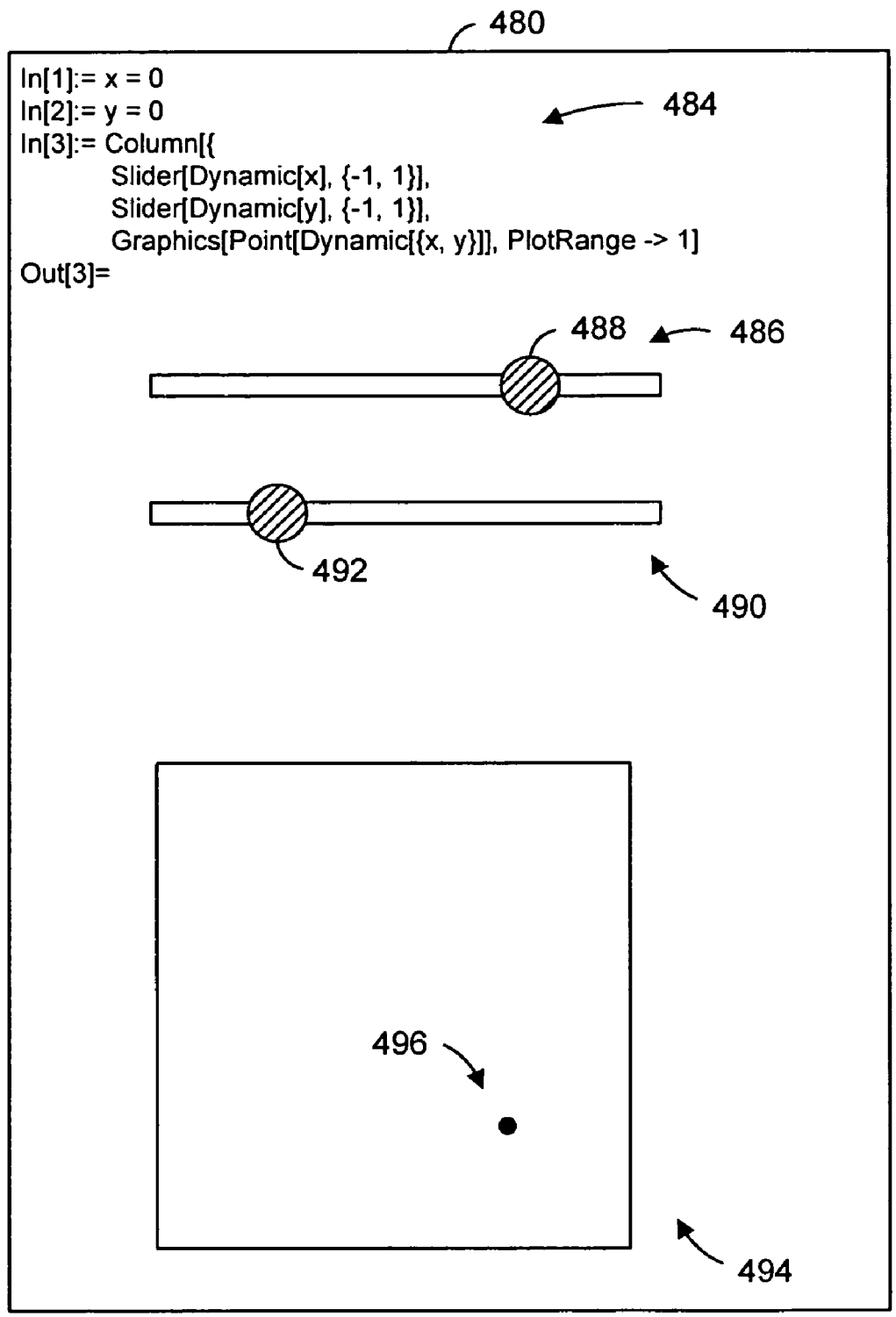

FIG. 11B is an illustration of the portion of the notebook 480 after a user moved the point 496 to a different position. This may have been accomplished in several ways. For example, the user could have first moved the knob 488 to the position illustrated in FIG. 11B. In response, the software system would modify the value of x to correspond to the new position of the knob 488. Additionally, because x had been modified and because x is dynamically linked to the position of the point 496 in the graphic 494, the software system would modify the position of the point 496 in the graphic 494 corresponding to the new value of x. Then the user could have moved the knob 492 to its new position. In response, the software system would then modify the value of y to correspond to the new positions of the knob 492. Additionally, because y had been modified and because y is dynamically linked to the position of the point 496 in the graphic 494, the software system would modify the position of the point 496 in the graphic 494 to correspond to the new value of y.

As another example, a user could have directly moved the point 496 to the position illustrated in FIG. 11B. For example, the user could have selected the point 496 using a mouse, a trackball, a touch pad, a touch screen, etc., and then dragged the point 496 to the new position. In response, the software system would modify the values x and y to correspond to the new position of the point 496. Additionally, because x and y have been modified and because x and y are dynamically linked to the positions of the knobs 488 and 492, the software system would modify the positions of the knobs 488 and 492. The computer system may redraw the notebook or a portion of the notebook many times as the knob 488 and the knob 492 are being moved by the user, and the graphic 494 may rapidly change to indicate the changing values of x and/or y.

Figure 12A:
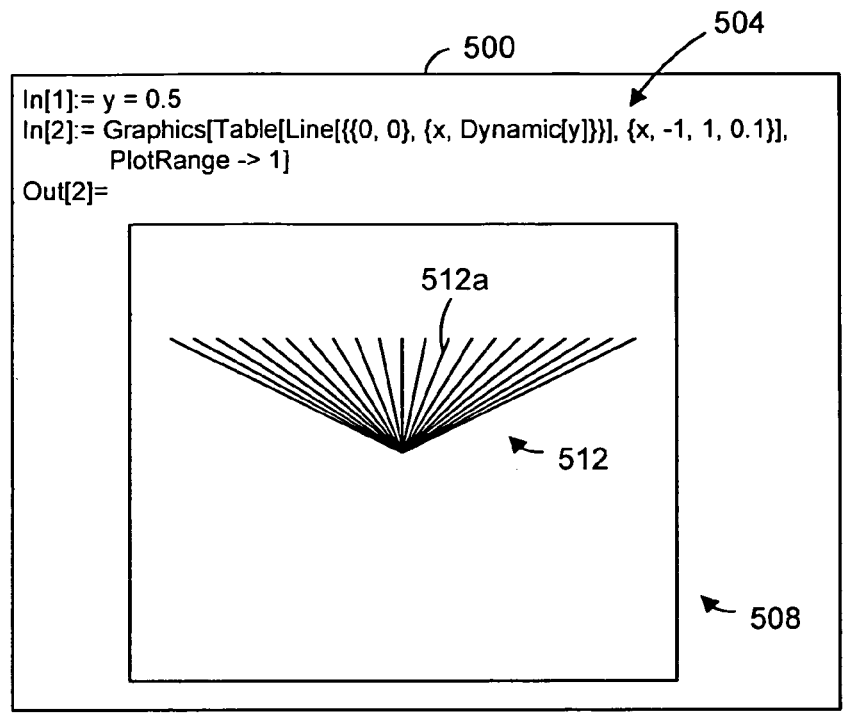
FIGS. 12A-12B are illustrations of an example interactive document in which endpoints of lines in a graphic are dynamically linked to each other.

FIG. 12A is an illustration of a portion of a notebook 500 in which different graphics elements are linked by a dynamic object. In the example notebook 500, this linking is achieved merely using a command to create a graphic.

In the notebook 500, the text 504 specifies a graphic to be created. The graphic comprises a plurality of lines that each has one end at the coordinate (0, 0). The other ends of the lines have x coordinates evenly spaced from −1 to +1. Additionally, the y coordinates of the other ends of the line are the dynamic object "Dynamic[y]".

The software system evaluated the text 504 and generated a graphic 508 having a plurality of lines 512 including a line 512a. One set of endpoints of the lines 512 in a position corresponding to y=0.5 because these endpoints are set to the value of the dynamic object "Dynamic[y]", and y has been set to 0.5.

Figure 12B:
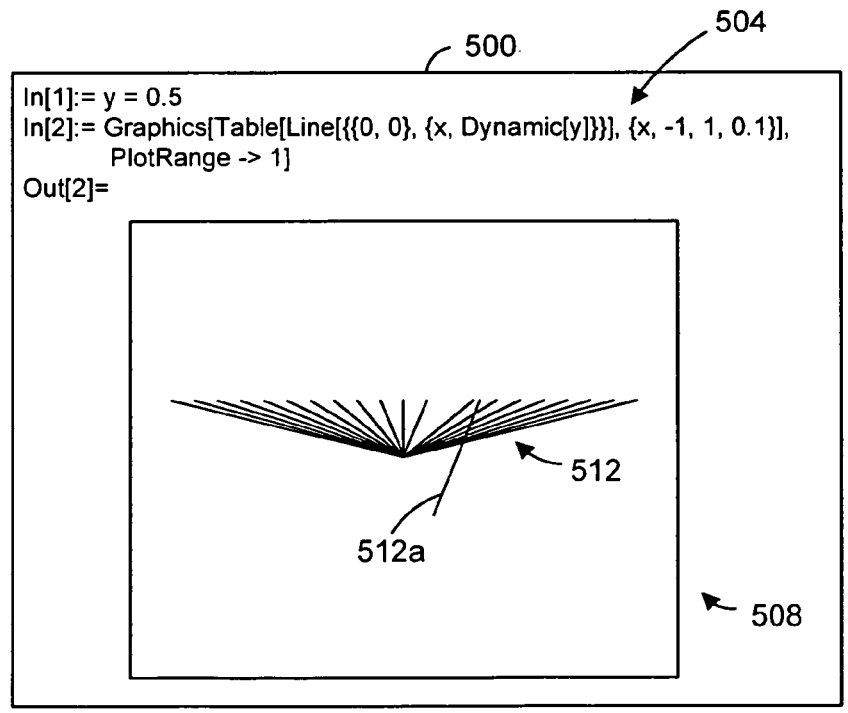

FIG. 12B is an illustration of the portion of a notebook 500 after a user has moved the line 512a to a different position. For example, the user could have selected the line 512a using a mouse, a trackball, a touch pad, a touch screen, etc., and then dragged the line 512a to the new position. In response, the software system would modify the value of y to correspond to the new endpoint of the line 512a. Additionally, because y was modified and because y is dynamically linked to the y coordinates of the endpoints of the other lines 512, the software system would modify the plot 508 to reflect the new endpoints of the lines 512.

As can be seen in the above description, complex dependency linking can be accomplished using very few commands. For example, a GUI interface may be created and linked to an underlying object using only one command line. Further simplification may also be achieved by providing commands that combine GUI interfaces with dynamic objects. One example is a "Manipulate" command having a syntax:

Manipulate[expr, {u, $u_{min}$, $u_{max}$}]

where the "expr" may be an expression such as a numeric expression, a symbolic expression, a plot, a graphic, etc., that depends on an underlying object "u" that may be manipulated between $u_{min}$, and $u_{max}$. When the software system evaluates the Manipulate command, it generates in a notebook a depiction of the value of the expression "expr" as well as a GUI mechanism such as a slider for manipulation of the object "u". Then when a user changes the object u via the slider, changed values of the expression "expr" are depicted in the notebook. Another syntax for the Manipulate command is:

Manipulate[expr, {u, . . . }, {v, . . . }, . . . ]

where the "expr" may be an expression that depends on one or more underlying objects u, v, . . . . When the software system evaluates the Manipulate command, it generates in a notebook a depiction of the value of the expression "expr" as well as one or more GUI mechanisms such as sliders for manipulation of the objects u, v, . . . . Then, when a user changes an underlying object via the GUIs, changed values of the expression "expr" are depicted in the notebook. One of ordinary skill in the art will recognize that the syntaxes described are merely examples and that many different syntaxes may be used additionally or alternatively.

Figure 13A:
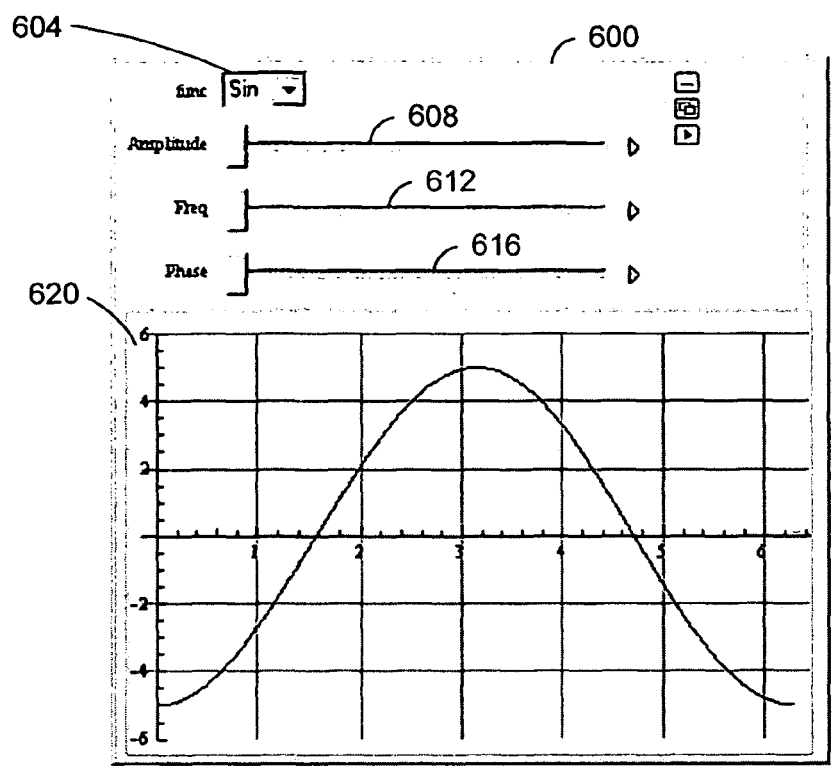
FIGS. 13A-13C are illustrations of an example interactive document in which a plot is dynamically linked to a pull-down menu and three sliders.

FIG. 13A is an example display 600 that can be created with a command such as a "Manipulate" command described above. For example, the display 600 may be created by the command line:

Manipulate[Plot[Amplitude func[Freq (x−Phase)], {x, 0, 2 π},

GridLines→Automatic, PlotRange→{−6, 6}], {func, {Sin, Cos, Tan, Sec,

Csc, Cot}}, {Amplitude, −5, 5}, {Freq, 1, 5}, {Phase, −π/2, π/2}].

The evaluated expression is a plot of a function named "func", and the name-"func" can take on one of six possible values: Sin, Cos, Tan, Sec, Csc, Cot. Additionally, the function "func" is also dependent upon underlying objects "Freq" and "Phase". Further, the plot is dependent upon the underlying object "Amplitude" because it is a plot of the function "func" multiplied by "Amplitude".

Figure 13B:
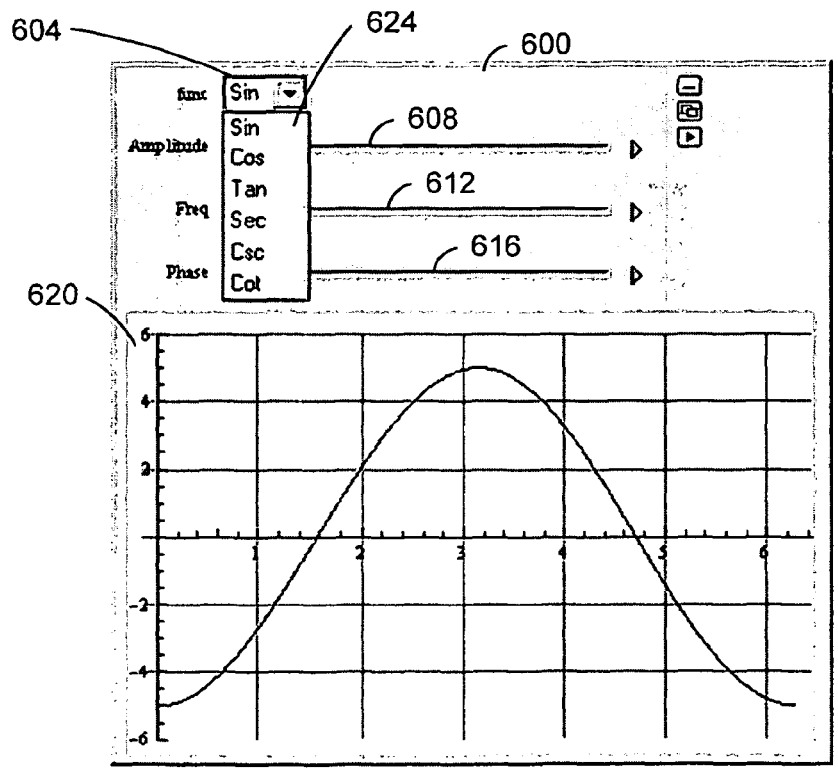
Figure 13C:
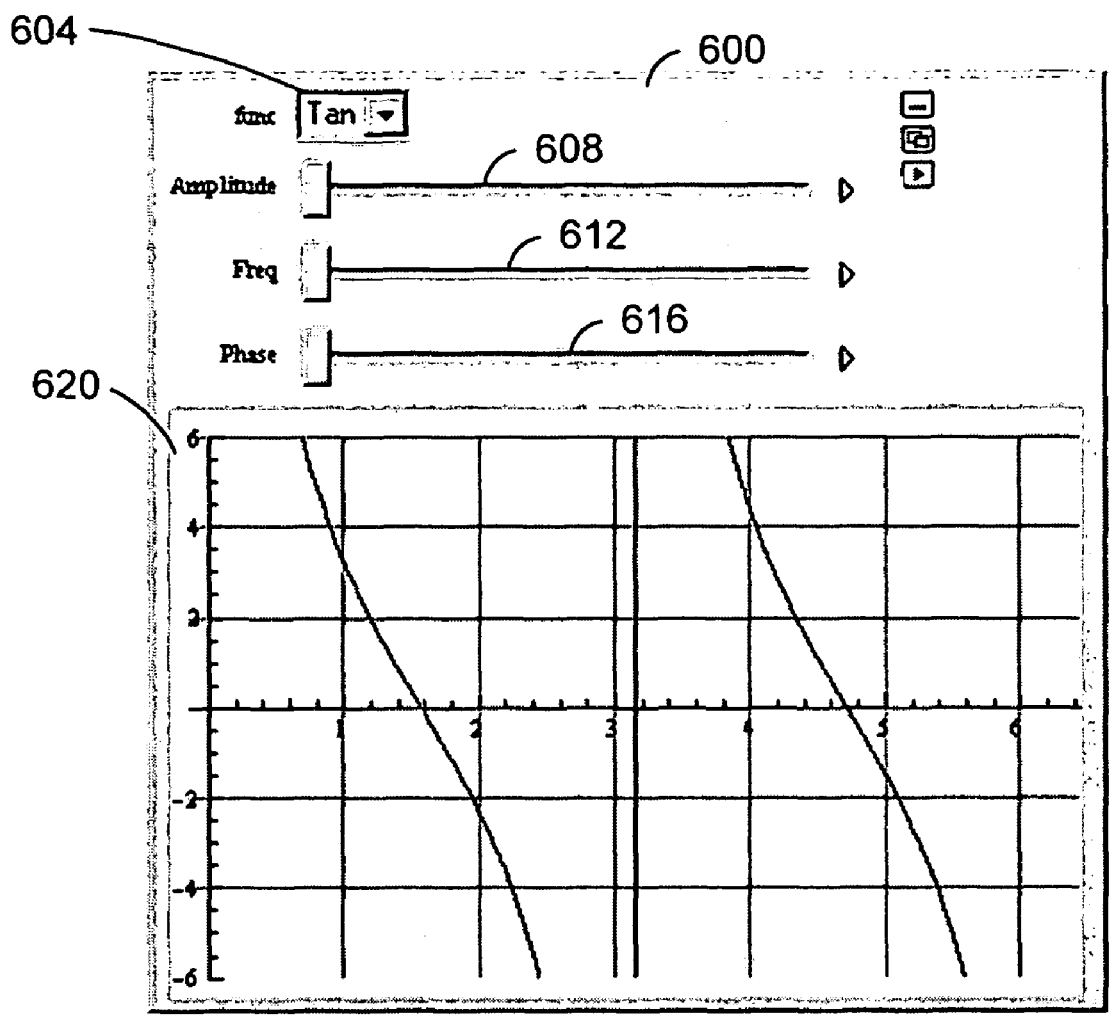

The display 600 includes a GUI mechanism 604 for selecting the value of the name "func". Also, the plot 600 includes a slider 608 for changing the "Amplitude" object, a slider 612 for changing the "Freq" object, and a slider 616 for changing the "Phase" object. Further, the evaluated "Plot" object is depicted in the plot 620. In FIG. 13A, the object "func" has been selected as "Sin". As a result, the computing system has evaluated the plot 620 as a plot of a Sine function multiplied by "Amplitude". FIG. 13B illustrates the display 600 in which a pull down menu 624 that may allow a user to select a value of "func" is depicted. FIG. 13C illustrates the display 600 after the value of "func" has been selected as "Tan". In response, the computing system has evaluated the plot 620 as a plot of a Tangent function multiplied by "Amplitude".

Thus, as can be seen in FIGS. 13A, 13B, and 13C, the name of a function to be evaluated can be made dynamic as well. In some implementations, any symbol in a command line can be easily designated by the user to be made a dynamic object. For example, the function, a name of the function, an argument of the function, etc., can be designated by the user as a dynamic object via a keyword, a pull-down menu, a shortcut key, etc.

Dynamic objects may be utilized in modifying many other types of objects and/or attributes of objects. For example, dynamic objects may be linked to animation, text, documents, attributes of objects (e.g., font type, font size, font color, background colors of plots, graphics, or documents, etc.). Additionally, the underlying object on which a dynamic object depends could be an object controlled outside of the software system such as a time value set by a computing system, a variable received from a separate computing system such as a measurement device, an electronic musical instrument, etc.

Although graphical user interface mechanisms were described above, mechanical user interfaces may be utilized as well such as game controllers, joysticks, knobs, dials, etc. Similarly, although rendering of indications of values on a display device was described above, other types of rendering may be implemented such as sending a value to a file or to another software application, generating audio, controlling light emitting diodes, controlling a stepper motor, etc. Thus, determining if it is time to render a dynamic object may depend on the type of rendering that is to be employed.

Referring again to FIG. 1, in another implementation the kernel 104 may comprise a server application such as web server and the front end 108 may comprise a client user interface application such as a web browser. In such an implementation, data can be represented by a formatted expression such as an extensible markup language (XML) data structure. Thus a dynamic object could be an XML data structure. In this implementation, when a dynamic object was to be updated, the web server could recalculate the value of the dynamic XML object and then cause the web browser to display an indication of the updated dynamic XML object. For example, the web server could send a refreshed page to the web browser or cause a portion of the page being displayed to the user to be updated. Extensible Style Language Transformation (XSLT) techniques could be utilized to update the dynamic XML object.

Any of the techniques described above, including the blocks described with reference to FIGS. 5, 5A, and 9, may be implemented using software comprising computer program instructions. Such computer program instructions may control the operation of a computing device such as a desktop computer, a laptop computer, a tablet computer, a workstation, a server, a mainframe, a cellular phone, a telephone, a set top box, a PDA, a pager, a processing system of an electronic toy, a processing system of an electronic game, a processing system of a consumer electronics device, etc. The computing device may have a memory in which the computer program instructions may be stored. The computer program instructions may be written in any high level language such as the programming language used with MATHEMATICAL software systems, C, C++, C#, Java or the like or any low-level assembly or machine language. By storing computer program instructions in a memory of the computing device, the computing device is physically and/or structurally configured in accordance with the computer program instructions.

While many methods and systems have been described herein as being implementable in software, they may be implemented in hardware, firmware, etc., and may be implemented by a variety of computing systems and devices. Thus, the method blocks and system blocks described herein may be implemented in a standard multi-purpose central processing unit (CPU), a special purpose CPU, or on specifically designed hardware or firmware such as an application-specific integrated circuit (ASIC) or other hard-wired device as desired. When implemented in software, the software routine may be stored in any computer readable memory such as on a magnetic disk, a laser disk (such as a compact disk (CD), a digital versatile disk (DVD)), a flash memory, a memory card, a memory stick, etc., or other storage medium, in a RAM or ROM of a computer or processor, in any database, etc. Likewise, this software may be delivered via any known or desired delivery method including, for example, on a computer readable memory or other transportable computer storage mechanism or over a communication channel such as a telephone line, the internet, etc. (which are viewed as being the same as or interchangeable with providing such software via a transportable storage medium).

The present disclosure has been described with reference to specific examples, which are intended to be illustrative only and not to be limiting. It will be apparent to those of ordinary skill in the art that changes, additions or deletions may be made to the disclosed examples without departing from the spirit and scope of the disclosure.

What is claimed is:

1. A method for presenting to a user information operated on by a computational software application implemented by a computer system having computer readable media and a display unit, the method comprising the acts of:
    displaying on the display unit a workspace associated with the computational software application;
    receiving user input entered via the computational software application implemented by the computer system, the user input including a command to create an underlying object to be operated on by the computational software application, to create a user interface mechanism to be displayed on the workspace, and that defines a mathematical relationship between states of the user interface mechanism and the underlying object;
    creating the underlying object using the computational software application implemented by the computer system in response to the user input;
    storing on the computer readable media configuration data corresponding to the mathematical relationship and data indicating that the user interface mechanism is linked to the underlying object in response to the user input, the configuration data capable of being interpreted by the computational software application;
    causing a current state of the user interface mechanism to be displayed on the workspace on the display unit in response to the user input;
    using the computational software application implemented by the computer system to determine that the current state of the user interface mechanism should be changed in response to a change in a value of the underlying object and without intervention by a user;
    using the computational software application implemented by the computer system to change the current state of the user interface mechanism according to the mathematical relationship in response to determining the current state of the user interface mechanism should be changed and without intervention by the user;
    causing the current state of the user interface mechanism to be displayed on the display unit without intervention by the user and in response to the change to the current state of the user interface mechanism;
    using the computational software application implemented by the computer system to detect a change in the current state of the user interface mechanism caused by the user; and
    using the computational software application implemented by the computer system to change the current value of the underlying object without intervention by the user in response to the detected change in the current state of the user interface mechanism and according to the mathematical relationship.

2. A method according to claim 1, wherein the configuration data comprises command line data capable of being evaluated by the computational software application.

3. A method according to claim 1, wherein the computational software application comprises at least one of:
    a software application capable of evaluating symbolic expressions;
    a spreadsheet application;
    a control system application;
    an instrument application;
    a simulation application;
    an interactive game application.

4. A method according to claim 1, wherein changing the current state of the user interface mechanism is further based on whether a time for rendering an indication of the current state of the user interface mechanism has occurred.

5. A method according to claim 1, further comprising rendering an indication of the current state of the user interface mechanism on the workspace.

6. A method according to claim 1, wherein the user interface mechanism comprises a slider.

7. A method according to claim 1, wherein the underlying object comprises an object capable of representing a plurality of types of data, the plurality of types of data including a symbolic expression.

8. A method according to claim 7, wherein the object capable of representing the plurality of types of data comprises an expression having information associated therewith that indicates a type of data from the plurality of types of data.

9. A computer readable medium having stored thereon machine executable instructions, the machine executable instructions capable of causing the machine to:
    receive user input including a command to create an underlying object to be operated on by a computational software application, to create a user interface mechanism to be displayed on the workspace, and that defines a mathematical relationship between states of the user interface mechanism located on a workspace associated with the computational software application and an underlying object operated on by the computational software application;
    create the underlying object in response to the user input;
    store in a computer system media configuration data corresponding to the mathematical relationship and data indicating that the user interface mechanism is linked to the underlying object in response to the user input, the configuration data capable of being interpreted by the computational software application;
    determine that the current state of the user interface mechanism should be changed in response to a change in a value of the underlying object and without intervention by a user;
    change a current state of the user interface mechanism based on the detected change in the value of the underlying object and according to the relationship;
    detect a change in the current state of the user interface mechanism caused by a user; and
    change the current value of the underlying object according to the mathematical relationship in response to determining the current state of the user interface mechanism should be changed and without intervention by the user.

10. A method for presenting to a user information operated on by a computational software application implemented by a computer system having computer readable media and a rendering device, the method comprising the acts of:
    using the computational software application implemented by the computer system to identify a dynamic object in a file, a value of the dynamic object being dependent upon at least one underlying object;
    using the computational software application implemented by the computer system to determine whether the value of the dynamic object is currently being rendered by the rendering device;
    using the computational software application implemented by the computer system to determine if a value of the underlying object has changed;

using the computational software application implemented by the computer system to determine whether to recalculate the value of the dynamic object in response to determining that the value of the underlying object has changed based on whether the value of the dynamic object is currently being rendered;

using the computational software application implemented by the computer system to recalculate the value of the dynamic object in response to determining that the value of the underlying object has changed and if it is determined that the value of the dynamic object should be recalculated; and using the computational software application implemented by the computer system to cause an indication of the value of the dynamic object to be rendered to the user by the rendering device.

11. A method according to claim 10, wherein the file includes command line data capable of being evaluated by the computational software application.

12. A method according to claim 11, wherein the command line data includes data indicative of an expression for recalculating the value of the dynamic object based on the value of the underlying object.

13. A method according to claim 10, wherein the computational software application comprises at least one of:
   a software application capable of evaluating symbolic expressions;
   a spreadsheet application;
   a control system application;
   an instrument application;
   a simulation application;
   an interactive game application.

14. A method according to claim 10, further comprising:
   using the computational software system implemented by the computer system to determine a relationship between states of a user interface mechanism and the underlying object;
   using the computational software system implemented by the computer system to detect a change in the current state of the user interface mechanism caused by a user; and
   using the computational software system implemented by the computer system to change the value of the underlying object according to the relationship based on the detected change in the current state of the user interface mechanism.

15. A method according to claim 14, wherein the user interface mechanism comprises at least one of a graphical user interface mechanism or a mechanical user interface mechanism.

16. A method according to claim 10, further comprising receiving an updated value of the underlying object from at least one of a simulation application, a hardware device, a measurement device, or a game controller.

17. A method according to claim 10, wherein causing the indication of the value of the dynamic object to be rendered comprises at least one of:
   causing a visual indication to be displayed on a display device;
   causing an audio indication to be generated; or
   causing an indication of the value to be sent to a hardware device.

18. A method according to claim 10, wherein the dynamic object comprises an object capable of representing a plurality of types of data, the plurality of types of data including a symbolic expression.

19. A method according to claim 18, wherein the object capable of representing the plurality of types of data comprises an expression having information associated therewith that indicates a type of data from the plurality of types of data.

20. A method according to claim 10, further comprising:
   using the computational software system implemented by the computer system to determine that the dynamic object is dependent upon the underlying object; and
   using the computational software system implemented by the computer system to store an indication that the dynamic object is dependent upon the underlying object.

21. A method according to claim 20, further comprising:
   using the computational software system implemented by the computer system to delete the indication that the dynamic object is dependent upon the underlying object upon determining that the value of the underlying object has changed; and
   using the computational software system implemented by the computer system to re-determine that the dynamic object is dependent upon the underlying object upon recalculating the value of the dynamic object.

22. A computer readable medium having stored thereon machine executable instructions, the machine executable instructions capable of causing the machine to:
   identify a dynamic object in a file operated on by a computational software application, a value of the dynamic object being dependent upon at least one underlying object;
   determine whether the value of the dynamic object is currently being rendered;
   determine whether to recalculate the value of the dynamic object in response to determining that the value of the underlying object has changed based on whether the value of the dynamic object is currently being rendered;
   determine if a value of the underlying object has changed;
   recalculate the value of the dynamic object in response to determining that the value of the underlying object has changed and if it determined that the value of the dynamic object should be recalculated; and
   cause an indication of the value of the dynamic object to be rendered to the user.

23. A method implemented by a computer system having computer readable media and a display unit for presenting information to a user, the method comprising the acts of:
   using the computer system to identify a dynamic object, a value of the dynamic object being dependent upon at least one underlying object, the value of the dynamic object comprising at least one of a symbolic expression, a graphic expression, or an animation;
   using the computer system to determine if a value of the underlying object changed;
   using the computer system to recalculate the value of the dynamic object if the value of the underlying object has changed; and
   using the computer system to cause an indication of the value of the dynamic object to be rendered to the user on the display unit.

24. A method according to claim 23, wherein the dynamic object comprises an object capable of representing a plurality of types of data.

25. A method according to claim 24, wherein the object capable of representing the plurality of types of data comprises an expression having information associated therewith that indicates a type of data from the plurality of types of data.

26. A computer readable medium having stored thereon machine executable instructions, the machine executable instructions capable of causing the machine to:

identify a dynamic object, a value of the dynamic object being dependent upon at least one underlying object, the value of the dynamic object comprising at least one of a symbolic expression, a graphic expression, or an animation;

determine if a value of the underlying object changed;

recalculate the value of the dynamic object if the value of the underlying object has changed; and cause an indication of the value of the dynamic object to be rendered to the user.

* * * * *